United States Patent [19]
Koizumi et al.

[11] Patent Number: 5,630,170
[45] Date of Patent: May 13, 1997

[54] SYSTEM AND METHOD FOR DETERMINING PERIPHERAL'S COMMUNICATION MODE OVER ROW OF PINS DISPOSED IN A SOCKET CONNECTOR

[75] Inventors: Masahiro Koizumi; Naoki Niizuma; Yasuhisa Kawase; Hajime Ikebe, all of Tokyo, Japan

[73] Assignee: Kabushiki Kaisha Sega Enterprises, Tokyo, Japan

[21] Appl. No.: 445,108

[22] Filed: May 19, 1995

[30] Foreign Application Priority Data

Oct. 12, 1994 [JP] Japan .................... 6-246581

[51] Int. Cl.⁶ .................... G06F 3/00; G06F 3/023; G06F 13/38
[52] U.S. Cl. .................... 395/834; 395/893; 463/36; 463/40
[58] Field of Search .................... 439/43, 189, 604, 439/45, 44, 46, 47, 49, 79, 95, 119, 221, 362, 369, 133; 395/834, 835, 831, 836, 893; 273/143 B; 463/36, 37, 38, 40; 345/161, 168

[56] References Cited

U.S. PATENT DOCUMENTS

| | | | |
|---|---|---|---|
| 4,484,266 | 11/1984 | Becker et al. | 364/200 |
| 4,501,424 | 2/1985 | Stone et al. | 273/143 B |
| 4,592,012 | 5/1986 | Braun | 364/900 |
| 4,888,680 | 12/1989 | Sander et al. | 364/200 |
| 4,972,470 | 11/1990 | Farago | 380/3 |
| 5,151,985 | 9/1992 | Sander et al. | 395/500 |
| 5,175,820 | 12/1992 | Gephardt | 395/834 |
| 5,179,710 | 1/1993 | Coschieri | 395/750 |
| 5,207,426 | 5/1993 | Inoue et al. | 273/148 B |
| 5,274,766 | 12/1993 | Long et al. | 595/834 |
| 5,375,210 | 12/1994 | Monnes et al. | 595/830 |
| 5,379,382 | 1/1995 | Work et al. | 395/275 |

FOREIGN PATENT DOCUMENTS

| | | |
|---|---|---|
| 60-27566 | 2/1985 | Japan . |
| 63-118830 | 5/1988 | Japan . |
| 63-118928 | 5/1988 | Japan . |
| 2-62618 | 3/1990 | Japan . |
| 9110715 | 11/1992 | United Kingdom . |
| WO-A-8809573 | 12/1988 | WIPO . |
| WO-A-9416774 | 8/1994 | WIPO . |
| WO95/01609 | 1/1995 | WIPO . |
| WO95/01629 | 1/1995 | WIPO . |
| WO95/01630 | 1/1995 | WIPO . |

OTHER PUBLICATIONS

Patent Abstracts of Japan, vol. 14, No. 240, p. 151, May 22, 1990 (Abstract of JP 2-062618).

*Primary Examiner*—Thomas C. Lee
*Assistant Examiner*—D. Dinh
*Attorney, Agent, or Firm*—Finnegan, Henderson, Farabow, Garrett & Dunner, L.L.P.

[57] ABSTRACT

A peripheral device for use with a data processing apparatus. The apparatus has a peripheral port with a set of terminal pins consisting of first to ninth pins disposed in a row. The first pin is assigned for one of a power source and the ground potential, the ninth pin for the other of the power source and the ground potential, the second, third, seventh and eighth pins for transmitting data signals, and the fourth to sixth pins for transmitting control signals. The apparatus has an element for selecting the communication mode of the peripheral device connected to the peripheral port, based on the data signals transmitted from the second, third, seventh and eighth pins. The peripheral device comprises a plug connector detachably connected to the peripheral port, the plug connector having a set of terminal pins consisting of first to ninth pins disposed in a row, a cable including a plurality of wires connecting the terminal pins of the plug connector with terminals on an internal printed circuit board, and an element for transmitting data signals including identification data representing the communication mode via at least one of the second, third, seventh and eighth pins in synchronization with a clock signal supplied from the apparatus.

61 Claims, 15 Drawing Sheets

SYSTEM AND METHOD FOR DETERMINING PERIPHERAL'S COMMUNICATION MODE OVER ROW OF PINS DISPOSED IN A SOCKET CONNECTOR

BACKGROUND OF THE INVENTION

1. Field of the Invention

The present invention relates to an improvement in communication between a data processing apparatus and a peripheral device to be connected to the data processing apparatus, and more specifically, to a system for identifying communication modes of the peripheral devices connected to a game apparatus and connector configurations suitable to the peripheral devices with various types of communication modes.

2. Description of Related Art

An image processing system is known as a system which has a display such as a television set, (hereinafter, referred to as a "monitor"), on which images are time-dependently displayed. As is widely known for home use, a game apparatus is one representative of such image processing systems.

The game apparatus comprises a processing unit executing game programs and generating video and audio signals. To the apparatus are connected various types of peripheral devices (frequently, referred to as simply "peripherals") such as manipulating switching assemblies called joy pad, controller, or key board. The processing unit mainly performs not only a predetermined image processing therein but also a variety of processings including control of the peripheral devices. The peripheral devices are used, for example, for inputting necessary information from an operator into the processing unit and for displaying image data such as graphic and character data supplied from the processing unit. The peripheral devices thus typically include an operator controller and a monitor having a screen and speaker.

When the processing unit to which the monitor and operator controller are connected is activated by a player or an operator, the monitor is able to display images on its screen and to produce sound from its speaker, depending on instructions of a given game software sent from the processing unit. The player can enjoy the game with the game apparatus.

The game apparatus is normally required to be able to carry out various games. This means that there is much possibility that various types of peripheral devices are connected to the processing unit.

Various interfaces are arranged between the processing unit and the peripheral devices in aid of communication therebetween. Further, because communication modes are often varied depending on the peripheral device, the processing unit is required to obtain information (peripheral identification data) representing the type of a connected peripheral device. For this requirement, it is proposed that the type of a connected peripheral device can be identified using logical values acquired through data lines of the peripheral device when the processing unit sends twice to the peripheral device a peripheral selection signal of logical values of "1" firstly, and then of "0". Such prior art is disclosed in Japanese patent Laid-open No.2-62618, for example.

However, the above identification method identifies in fact only the type of a connected peripheral device on the basis of logical values acquired though data lines of the device. In other words, this identification method does not give attention to the communication mode of a connected peripheral device. This results in a drawback that, frequently, connected peripheral devices cannot send data to the processing unit and also the processing unit cannot control the peripheral devices with preferable communication modes for those peripheral devices.

SUMMARY OF THE INVENTION

Accordingly, an object of the present invention is to make it possible for a data processing apparatus to communicate for data transmission employing various types of communication modes with various peripheral devices.

Another object of the present invention is to provide a data processing apparatus adaptable to various types of communication modes.

Still another object of the present invention is to provide a connector plug configuration, which connects a peripheral device to a data processing apparatus adaptable to various types of peripheral devices.

Still another object of the present invention is to provide a peripheral device having a connector assembly suitable for transmission of control signals and data with a data processing apparatus.

Still another object of the present invention is to provide a data processing apparatus with a system for identifying various types of communication modes of peripheral devices connected to the apparatus.

Still another object of the present invention is to provide a data processing apparatus with a system for controlling various types of peripheral devices connected to the apparatus through a connector with an improved pin or terminal contact configuration.

According to one aspect of the invention, directed to one or more of the above objects, there is provided a peripheral device for use with a data processing apparatus having a peripheral port. The peripheral device includes a connector detachably connectable to the peripheral port, the connector having a set of terminal contacts including first to ninth contacts disposed in a row. The first contact is for connecting to one of a power source potential and ground potential; and the ninth contact is for connecting to the other of the power source potential and the ground potential. The second, third, seventh and eighth contacts are for transmitting data signals. The fourth to sixth contacts are for transmitting control signals. The apparatus further includes a cable including a plurality of wires connecting ones of the terminal contacts of the connector with a printed circuit board of the peripheral device and includes means for transmitting data signals including identification data representing a communication mode of the peripheral device to the data processing apparatus via at least one of the second, third, seventh and eighth contacts in synchronism with a clock signal supplied from the data processing apparatus when the connector is connected to the peripheral port.

According to one implementation of this aspect of the invention, there is provided a peripheral device for use with a data processing apparatus, the apparatus having a peripheral port with a set of terminal pins consisting of first to ninth pins disposed in a row. The first pin is for connecting to one of a power source and ground potential; and the ninth pin is for connecting to the other of the power source and the ground potential. The second, third, seventh and eighth pins are for conducting data signals and the fourth to sixth pins are for conducting control signals. The apparatus has means for determining a communication mode for communicating with a peripheral device connected to the peripheral port based on the data signals received on the second, third, seventh and eighth pins.

Further, the peripheral device includes a plug connector detachably connectable to the peripheral port, the plug connector having a set of terminal pins consisting of first to ninth pins disposed in a row correspondingly to the first to ninth pins of the peripheral port. The peripheral device further includes a cable including a plurality of wires connecting ones of the terminal pins of the plug connector with a printed circuit board of the peripheral device and means for transmitting data signals including identification data representing the communication mode of the peripheral device via at least one of the second, third, seventh and eighth pins in synchronism with a clock signal supplied from the apparatus when the plug connector is connected to the peripheral port.

According to another aspect of the invention, there is provided a game apparatus including a data processing apparatus having a peripheral port with a plurality of terminal pins disposed in a row. The terminal pins include a pair of first pins. One of the first pins is for connecting to one of a power source and ground potential and the other of the first pins is for connecting to the other of the power source and the ground potential. The terminal pins include at least one second pin for conducting data signals and a plurality of third pins for conducting control signals. The data processing apparatus further has means for determining a communication mode based on the data signals conducted by the at least one second pin, means for conducting a clock signal via one of the third pins, and means for communicating in the determined communication mode.

The game apparatus further includes a peripheral device having a plug connector detachably connected to the peripheral port, the plug connector having a plurality of contacts identical in number and disposed in a row in correspondence to the terminal pins of the peripheral port. The peripheral device further has a cable including a plurality of wires connecting the contacts of the plug connector with a printed circuit board of the peripheral device and means for transmitting data signals including identification data, representing the communication mode of the peripheral device via the at least one second pin to the data processing apparatus in synchronism with the clock signal when the plug connector is connected to peripheral port.

DETAILED DESCRIPTION OF THE PREFERRED EMBODIMENTS

An embodiment of the present invention will now be explained with reference to FIGS. 1 to 14.

Figure 1:
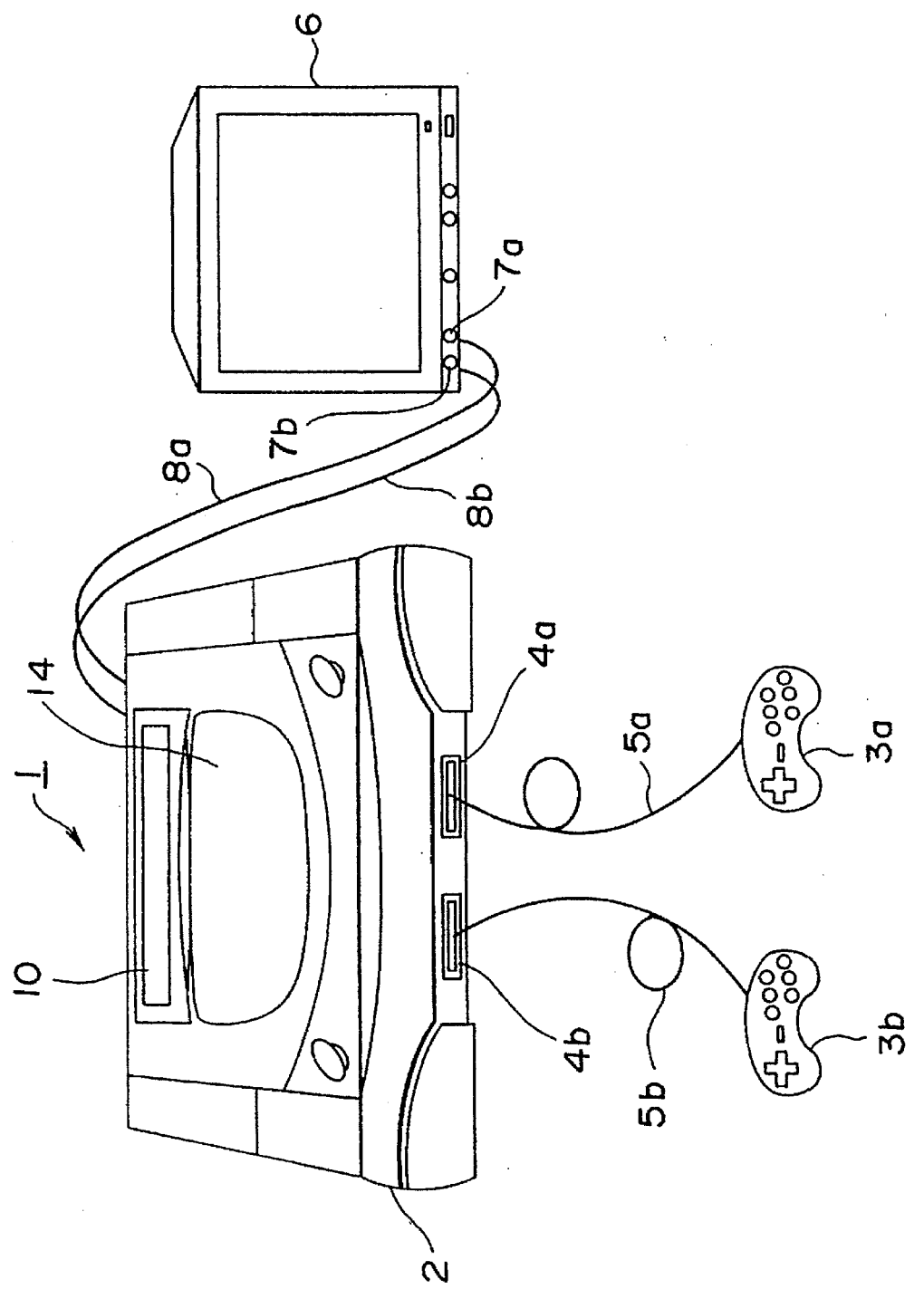
FIG. 1 is a perspective illustration of a game system embodying the present invention.
Figure 4:
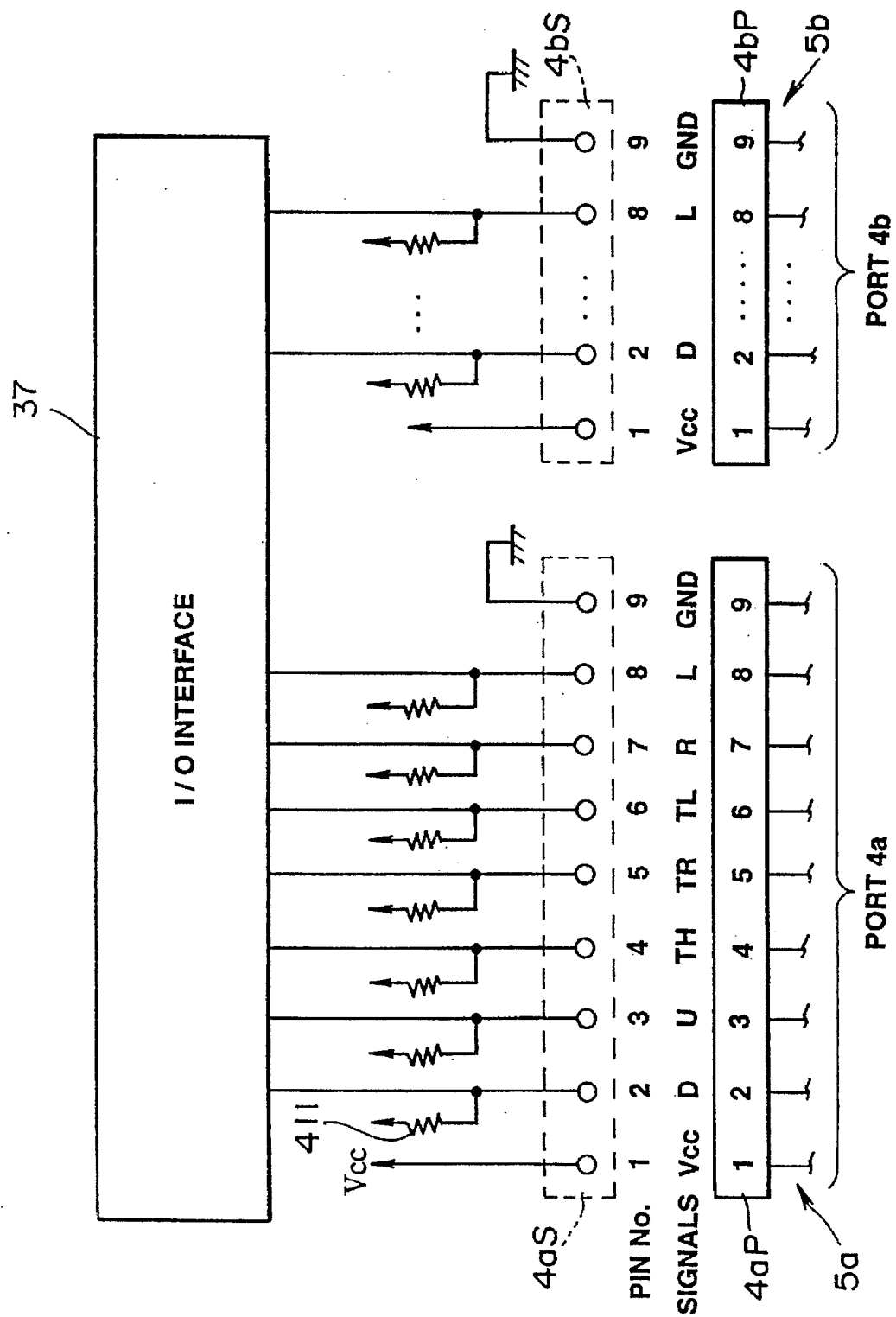
FIG. 4 shows a connector configuration of peripheral ports.

FIG. 1 shows a perspective view of a game system 1 to which the present invention is applied. The game system 1 comprises a game apparatus 2 functioning as the data processing apparatus for processing game programs and controlling various operations and control switch assemblies or controllers 3a and 3b as an example of peripheral devices to the game apparatus. As for the controllers, such control keys disclosed in U.S. patent application Ser. No. 08/245, 446 may be used. The apparatus 2 is provided with connector ports 4a and 4b for connecting peripheral devices. As also seen in FIG. 4, each of the connector ports 4a and 4b has a socket or a socket connector 4as(4bs) to which a plug or a plug connector 4ap(4bp) can be connected and disconnected.

The plugs 4ap and 4bp are connected to the controllers 3a and 3b through cables 5a and 5b, respectively. The controllers 3a and 3b are electrically and functionally connected to internal circuits of the game apparatus 2 via the cables 5a and 5b when the plugs 4ap and 4bp are inserted into the sockets 4as and 4bs.

Each of the plugs 4ap and 4bp has a configuration of plug pins which ensures transmission of a communication mode employed for the controllers 3a and 3b to the game apparatus 2. Further, the apparatus 2 comprises a video output terminal and an audio output terminal not shown.

The video output terminal is connected to a video input terminal 7a of a monitor 6, such a television set, through a cable 8a. Also the audio output terminal is connected to an audio input terminal 7b of the monitor 6 through a cable 8b.

The game apparatus 2 has a CD-ROM drive block 14 positioned at the central portion thereof. The CD-ROM drive block 14 is installed with a CD-ROM drive 9 and an optical pickup to read game program data or audio/video software from CD-ROM discs mounted thereto. The apparatus is further provided with a cartridge port 10 positioned at the rear side of the CD-ROM drive block 9. The cartridge port portion 10 is installed therein with a socket connector to which are connected devices such as a ROM/RAM cassette or an optional adapter for providing additional functions (not shown).

The apparatus 2 carries out a wide variety of information processings and controls such as image processings, audio processings and control of peripheral devices as well as processing of game programs. The controllers 3a and 3b provide operating signals to the apparatus 2. Video and audio signals generated by the apparatus 2 are given to the monitor 6 through the cables 8a and 8b.

Figure 2:
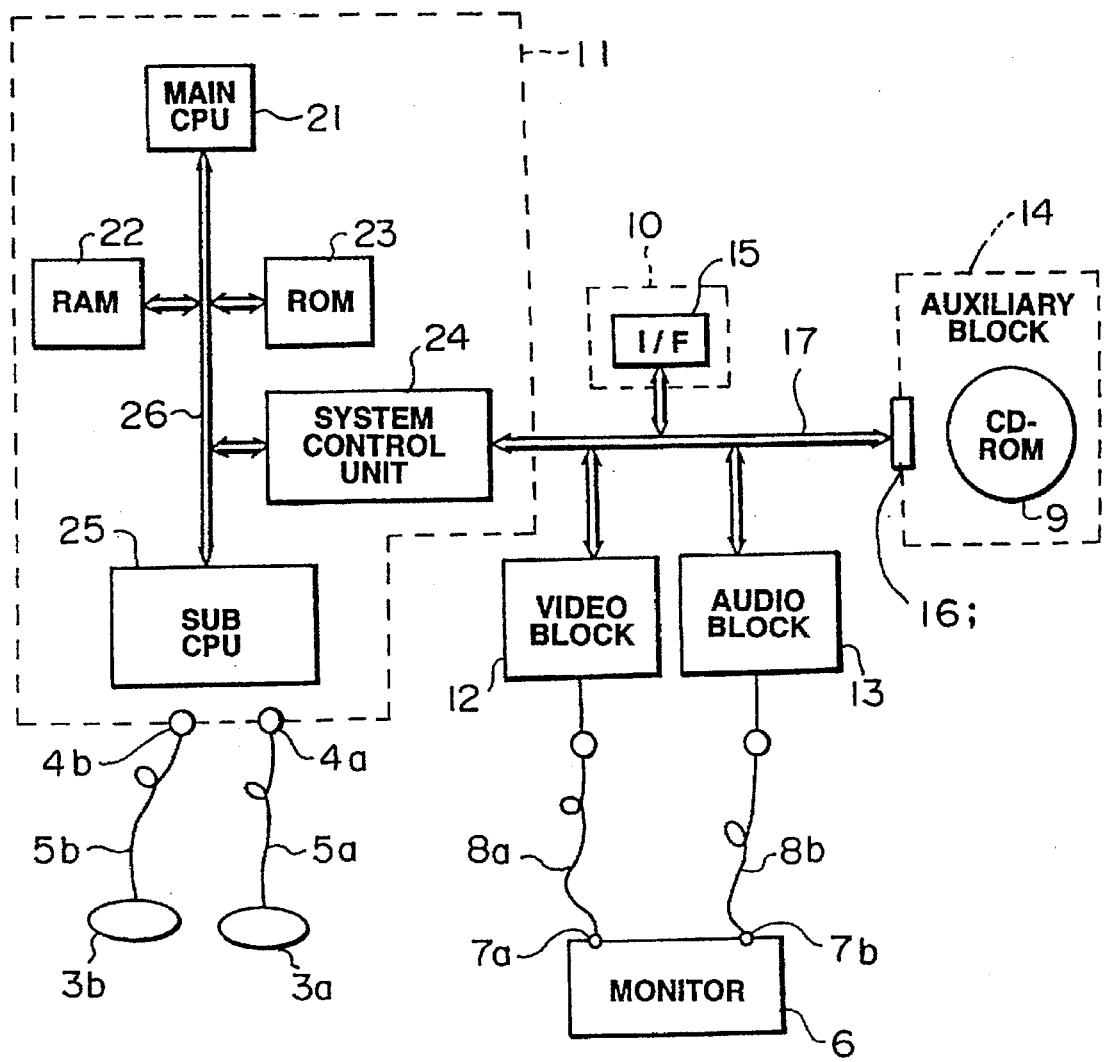
FIG. 2 is a basic block diagram showing the game system.

FIG. 2 exemplifies a block diagram of the game apparatus 2. The apparatus 2 shown therein comprises a processing block 11, video block 12, audio block 13, and auxiliary block or CD-ROM drive block 14. The cartridge port 10 includes a cartridge interface (I/F) 15 and the auxiliary block 14 includes a compact disk interface (I/F) 16.

The processing block 11 comprises a main processing unit (CPU) 21, RAM 22, ROM 23, system control unit 24, and sub CPU 25. The main CPU 21 is functionally connected, via a bus line 26, to the RAM 22, ROM 23, system control unit 24, and sub CPU 25.

Through the bus line 26, system control unit 24 and a bus line 17, the main CPU 21 is functionally connected with the video block 12, audio block 13, cartridge I/F 15, and CD I/F 16. The CD I/F 16 of the auxiliary block 14 is connected with the CD-ROM drive 9.

The main CPU 21 controls the entire processings of the system. In order to enhance control capability, the main CPU 21 consists of 32-bit RISC type high speed CPUs (two CPU chips called SH-2) and provides an improved, high speed calculating operation which may function similarly as a digital signal processor (DSP).

RAM 22 has, for example, a memory capacity of 32 megabits in all, a memory area of 16 megabits of which is assigned to the main CPU 21, for example. The remaining memory area of the RAM 22 is assigned to the video block 12 and audio block 13. ROM 23 stores initial programs or bootstrap programs for the hardware and for the cassette ROM and the CD-ROM.

The system control unit 24 functions as a co-processor to the main CPU 21 so that the unit 24 interfaces 16 bit bus 17 to which the video block 12, audio block 13 and auxiliary block 14 are connected with 32 bit bus 26 to which the main CPU 21 is connected.

When the electric power is on and/or a reset button is pushed down, the sub CPU 25 not only resets the entire system but also carries out data collection from the peripheral devices such as the controllers 3a and 3b to control the peripheral devices. Also the sub CPU 25 can change the clock frequency of the entire system.

The sub CPU 25 further includes a connection-exchanging means described below. The connection-exchanging means selectively connects the peripheral devices such as the controllers 3a and 3b connected to the connector ports 4a and 4b with either a CPU core 31 (refer to FIG. 3) in the sub CPU 25 or the main CPU 21.

The video block 12 forms video signals on the basis of video control signals given from the main CPU 21 through the system control unit 24 and provides the monitor 6 the video signals through the cable 8a. This permits the monitor 6 to display images on its screen. The details of the video block 12 may be referred to PCT/JP94/01068 (filed Feb. 24, 1995 in U.S.), PCT/JP94/01067 (filed Feb. 27, 1995 in U.S.), PCT/JP94/01066 (filed Feb. 27, 1995 in U.S.).

The audio block 13 generates digital audio signals on the basis of audio control signals given from the main CPU 21 through the system control unit 24, converts those digital audio signals into corresponding analog audio signals by a digital/analog (DA) converter incorporated therein, and provides the monitor 6 the converted analog audio signals through the cable 8b. Such processing permits an audio speaker of the monitor 6 to produce sound.

Figure 3:
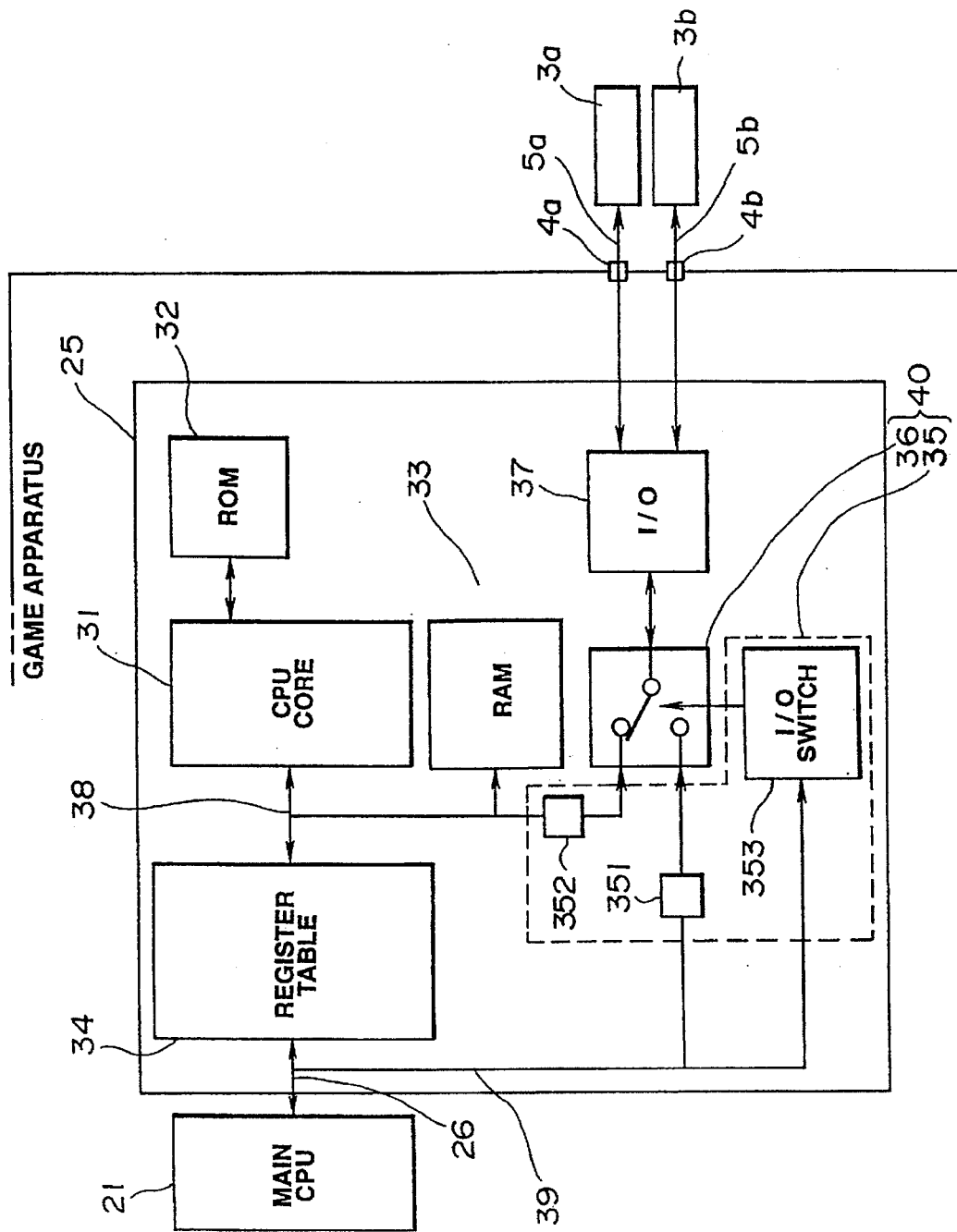
FIG. 3 is a block diagram showing the connection between a main CPU and a sub CPU functioning as a system for managing and controlling peripheral devices and showing the block diagram of the sub CPU.

The sub CPU 25 will be explained with reference to FIG. 3. FIG. 3 represents in block diagram the configuration of the sub CPU 25 which acts as a unit for controlling and managing peripheral devices. As shown in the figure, the sub CPU 25 is coupled with the main CPU 21 by way of the bus line 26. The sub CPU 25 comprises a CPU core 31, ROM 32, RAM 33, register table 34, register group 35, multiplexer 36, and I/O interface 37.

The CPU core 31, for example, may be a 4-bit CPU. The CPU core 31 is coupled with the ROM 32 to receive required programs from the ROM 32. Coupled with the CPU core 31 through a bus line 38 are the RAM 33, register table 34, and the register group 35. Further, the register group 35 is coupled with the I/O interface 37 via the multiplexer 36. The register group 35 and multiplexer 36 compose the connection-exchanging means 40.

The register group 35 may be sub-grouped into a main-CPU register group 351, a sub-CPU register group 352, and an I/O section register 353. The main-CPU register group 351 has two terminals; one is connected with the main CPU 21 through a bus line 39 and the bus line 26, while the other is connected with one of the two exchanging terminals of the multiplexer 36. The sub-CPU register group 352 has also two terminals; one is connected with the CPU core 31 through a bus line 38, while the other is connected with the other of the exchanging terminals of the multiplexer 36.

The multiplexer 36 has a common terminal connected with the I/O interface 37. The interface I/O 37 is connected with the connector ports 4a and 4b. The connector ports 4a and 4b are connected, through cables 5a and 5b, with the controllers 3a and 3b, respectively.

In response to data specified in the I/O section register 353, the multiplexer 36 functionally connects the peripheral devices such as the controllers 3a and 3b selectively to either the CPU core 31 through the register group 352 and bus line 38 or the main CPU 21 through the register group 351 and bus lines 39 and 26.

The CPU core 31 is designed such that, when the CPU core 31 is electrically connected with the peripheral devices via the multiplexer 36, the CPU core 31 communicates with the peripheral devices in the order of "peripheral ID-1", "peripheral ID-2", "data size" and "data", decides a communication mode from those IDs (identification data), and then performs collection, transmission and exchanges etc. of the data.

In this embodiment, the data "peripheral ID-1", which consists of 4-bit data, represents a communication mode as well as the type of a peripheral device. The data "peripheral ID-2", which also consists of 4-bit data, is a type of data representing the device model of a peripheral device and consists of a set of data showing a device model focusing on signal types showing whether the signal is, for example, analog or digital. The "data size" represents the total bite number of data from a peripheral device and will be shown by references "DSIZE0 to DSIZE3" in figures described below. The "data" represents data, which are supplied from a peripheral device, of the total bite number specified by the "data size". The CPU core 31 reads the data having the above total number at every 4-bit, because the CPU core 31 is a 4-bit processor in this embodiment.

Although the register group 35, multiplexer 36 and I/O interface 37 have two-channel circuits, respectively, this embodiment shows only one-channel circuit for simplified explanation.

Details of sub CPU 25 may be referred to co-pending Japanese patent applications Nos. 6-246579 and 6-246580 (see U.S. application Ser. No. 08/656,226).

As shown in FIG. 4 the I/O interface has two channels connected to peripheral ports 4a and 4b. Each of the peripheral ports 4a and 4b has a set of socket pins 1 through 9. Pins 2 through 8 are connected to I/O interface and assigned to send and receive a set of specific signals. Names and functions of the signals are shown in Table 1.

As shown in FIG. 4, each of plugs 4ap and 4bp which are to be connected to the sockets 4as and 4bs respectively has a set of plug pins 1 through 9 corresponding to the socket pins 1 through 9. The plug 4ap and 4bp are connected to main circuits of peripheral devices via cables 5a and 5b.

TABLE 1

| Signal Name | Pin No. | Remarks |
| --- | --- | --- |
| TH | 4 | Control signal from game apparatus |
| TR | 5 | Control signal from game apparatus |
| TL | 6 | Control signal to game apparatus(ack) |
| R | 7 | Data signal (third bit) |
| L | 8 | Data signal (second bit) |
| D | 2 | Data signal (first bit) |
| U | 3 | Data signal (0-th bit) |
| Vcc | 1 | Power Source(+5V) |
| GND | 9 | GND |

Pins nos. 4 to 6 are assigned for control signals. Pin no. 4 is the first control pin and assigned for transmitting a peripheral selection signal TH from the game apparatus 2 to the peripheral device (for example, controllers 3a, 3b). Pin no. 5 is the second control pin and assigned for transmitting a data request signal TR from the game apparatus to the peripheral device. Pin no. 6 is the third control pin and assigned for transmitting a peripheral acknowledgement signal TL from the peripheral device to the game apparatus.

Pins nos. 2, 3, 7 and 8 are assigned for data signals. Pin no. 2 (the first data pin) is assigned for transmitting a bit data D, pin no. 3 (the second data pin) for a bit data U, pin no. 7 (the third data pin) for a bit data R, and pin no. 8 (the fourth data pin) for a bit data L, respectively. The data R is mainly used for data transmission to the game apparatus 2. The input/output directions of data for these signals D, U, R and L can optionally be specified in accordance with the kind of the peripheral device connected to the apparatus 2. The signal R represents the third bit of the data, L the second bit, D the first bit and U the 0-th bit, respectively.

Pins 2 through 8 are connected to an electric power source Vcc by way of resistors 411, respectively, thereby to pull up the voltage levels of the signal lines (pins nos. 2 to 8) to the level of the power source Vcc.

When a peripheral device is not connected to the port 4a (4b) the voltage level on each of pins nos. 2 to 8 is equal to the voltage value of the power source Vcc (i.e. logical value=binary value "1"). Thus, the sub CPU 25 identifies that a peripheral device is not connected to the socket 4as (4bs) when it receives these data of the voltage state "1", for example, for D, U, R and L.

Pins nos. 5 and 6 are mainly assigned for transmitting control signals between the game apparatus and the peripheral devices in the above description. However, pins 5 and 6 may be used for data signal transmission where a peripheral device employs either the clocked parallel communication mode or clocked serial communication mode which will be described below.

Pin no. 3 is assigned to the signal Vcc which represents the power source (voltage: +5 V). The pin no. 9 is assigned to the signal GND which represent the ground potential (voltage: zero).

Figure 5A:
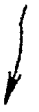
FIGS. 5A to 5C are pin configurations of plug connectors employed to accommodate typical communication modes.
Figure 5B:
Figure 5C:

FIGS. 5A to 5C explains a variety of pin configurations for plugs 4ap and 4bp which vary depending on communication modes employed by peripheral devices. FIG. 5A shows a pin configuration for standard communication modes including a TH/TR-selection communication mode and a three-wire handshake communication mode, FIG. 5B shows a pin configuration for a clocked parallel communication mode (clock-synchronized-type parallel communication mode), and FIG. 5C shows a pin configuration for a clocked serial communication mode (clock-synchronized-type serial communication mode), respectively. The clocked parallel and serial communication modes correspond to the non-standard type of modes.

These pin configurations are prepared to easily accommodate a large number of types of peripheral devices, such as a control PAD, mouse, key board, modem and memory unit, and different communication modes which may change according to peripheral devices.

Typical communication modes employed by a variety of peripheral devices are, for example, a TH/TR-selection communication mode, a three-wire handshake mode, a clocked parallel mode, and a clocked serial mode. A peripheral device employing the TH/TR-selection and three-wire handshake communication modes requires all of the socket/ plug pins 1 through 9 of the connector port 4a (4b) to be used electrically independently. Accordingly, as shown in FIG. 5A, all the pins 1 through 9 of the plug 4ap (4bp) are not short-circuited to each other.

On the other hand, where a peripheral device employs the clocked parallel communication mode, pin no. 5 assigned for the data request signal TR and pin no. 6 assigned for peripheral acknowledgment signal TL can electrically be short-circuited as shown in FIG. 5B. Further, in case of a peripheral device employing the clocked serial communication mode, the data transmission lines in the connector port 4a (4b) can be reduced to one line in principle, and it is possible to transmit data through the one data line in cooperation with the two peripheral selection line (TH) and data request line (TR). Accordingly, as shown in FIG. 5C, pin no. 2 may be connected to Vcc and pins 6 to 8 may be connected to GND.

As is exemplified above, it is understood that each of the connector ports 4a and 4b have a certain requirement in the number of needed signal lines (i.e., pins), which is determined in accordance with the employed communication mode. The processing apparatus 2 can use logical values on specified signal lines (in other words, specified pins) at the connector ports 4a and 4b to decide communication modes. Namely the apparatus 2 can determine the communication modes according to the logical values on the signal lines (pins).

Thus, in order to identify the employed communication mode, it should be essential to know the numbers of pins required to transmit data and the logical values on each signal line (i.e., each specified pin). In the present embodiment, the pin configurations of the plugs are designed to be able to transmit effectively to the apparatus 2 the logical values required to decide the communication mode employed by a peripheral device. In consequence, the apparatus 2 can quickly decide the employed communication mode.

Where the communication mode of a peripheral device is clocked parallel mode, the pin configuration of each plug 4ap (4bp) of the connectors are shown in FIG. 5B. In this mode, the apparatus 2 transmits to the controllers 3a and 3b a specified logical value ("1" or "0") as the peripheral selection signal TH and given clock signals as the data request signal TR. In response to this, signals of required logical values are then quickly provided through the data lines from the controllers 3a and 3b in synchronization with the clock signals. As shown in FIG. 5B, the pin 5 for the data request signal TR is short-circuited with the pin 6 for the peripheral acknowledgment signal TL in this clocked parallel communication mode, thereby the signals (voltages) on both the plug pins no. 5 and 6 being the same. Accordingly the signal TR transmitted from the apparatus 2 to pin no. 5 is sent back almost simultaneously from pin no. 6 to the apparatus 2 as the signal TL. Thus, the apparatus 2 identifies the clocked parallel mode by sensing signal TL equal to signal TR.

Further, in case of a peripheral device of the clocked serial communication mode, only one signal line (U) is required to transmit data. In addition, only the peripheral selection signal line (TH) and data request signal line (TR) transmitting clock signals are required as control lines. Logical values needed to identify this communication mode may be set as R=L="0", D="1", and U="0". These requirements may be realized by such pin configurations of the plugs 4ap and 4bp as shown in FIG. 5C in which plug pins which are not used for transmitting data and control signals are connected to fixed potentials (Vcc and GND). For example, pin no. 2 is connected to the power source Vcc and pins nos. 6 to 8 are connected to the ground GND, This plug-pin configuration will make it possible to produce required logical values representing the clocked serial communication mode at the pins of the plugs 4ap and 4bp, thus such logical values being supplied to the apparatus 2.

The short-circuit between the pins in FIGS. 5B and 5C may be achieved either by putting a short-circuit wire bridging connecting portions at which the plug pins are connected to the corresponding wires contained in the cable 5a (or 5b) in the plug or by providing a short-circuit pattern on a printed circuit board arranged in the plug 4ap (4bp). This reduces in number wires in the cable 5a (or 5b) connecting the plug 4ap (4bp) to the main circuit of a peripheral device.

The foregoing short-circuit can also be achieved within the main circuit of a peripheral device either by putting a short-circuit wire bridging wires of the cable 5a (or 5b) or by forming a specified short-circuit printing pattern on a printed circuit board in the peripheral device.

Particularly in the case of pin configuration of the plug 4ap (4bp) shown in FIG. 5C assigned to the clocked serial communication mode, the no. 2 pin is short-circuited and electrically connected to the no. 1 pin (signal Vcc; power source pin) and the pins nos. 6 to 8 are all short-circuited and electrically connected to the no. 9 pin (signal GND; ground pin), And accordingly wires in the cable connecting the plug 4ap (or 4bp) with the main circuit of a peripheral device can largely be decreased in number, because only the lines of the data signal U and the control signals TH and TL are required.

On one hand, when the pin configuration of FIG. 5C is effectively realized within a peripheral device, the lines of the cable, independent of signal transmission, are electrically connected to the power source and the ground potential, which leads to reduced noises which may fall onto the lines.

The functional schematic diagram of controllers as representatives of peripheral devices employing the foregoing various communication modes will now be explained with reference to FIGS. 6A to 6D which use, as relevant, the same reference numerals as ones described above.

Figure 6A:
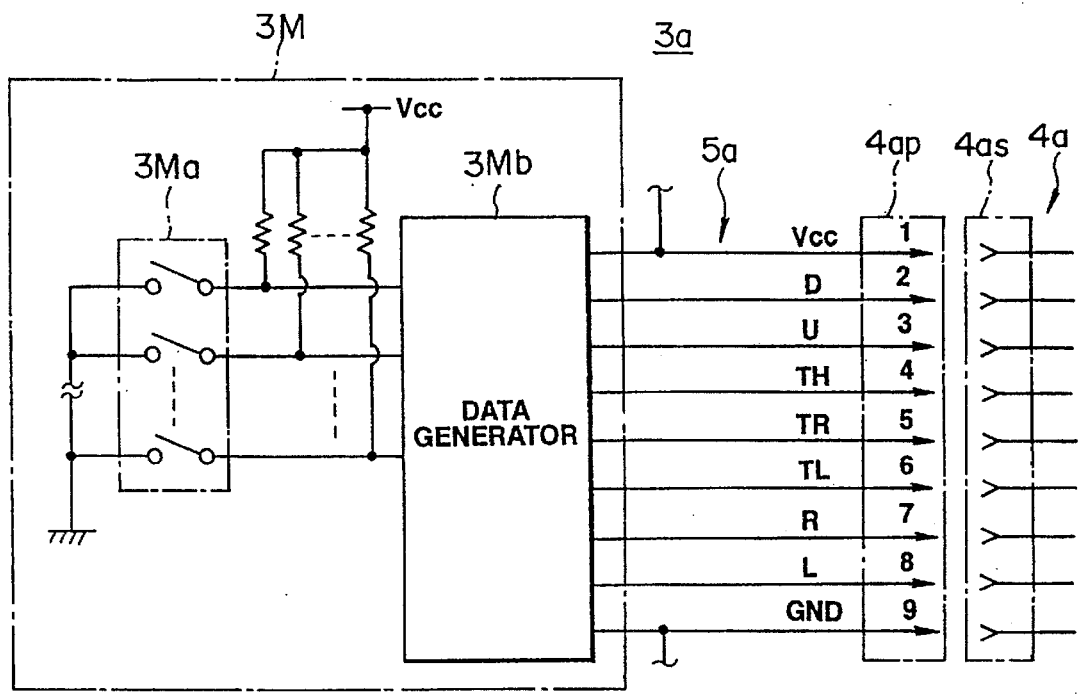
FIGS. 6A to 6D are functional block diagrams of typical controllers as peripheral devices.

FIG. 6A shows a controller 3a employing the TH/TR-selection type communication mode. "TH/TR selection type communication mode" used in this specification means a communication mode in which, as shown in Table 3, manipulation data which are generated in response to key switches on the peripheral device manipulated by an operator or a game player, as well as the identification data, are supplied to the data processing device in response to control signals. The control signals, as shown in Table 3 for example, are any of four combinations of two bit data TH and TR via the fourth and fifth pins. The controller 3a comprises the plug connector 4ap, the cable 5a having nine wires connected to the nine plug pin nos. 1 to 9 of the plug connector 4ap, and a main circuit 3M to which the wires of the cable 5a are connected. The nine plug pin nos. 1 to 9 are electrically independent from each other and individually connected to the nine wires of the cable 5a. The main circuit 3M has an operating portion 3Ma and a data generator 3Mb. The operating portion 3Ma, which is operated by a player, includes keys and/or switches. The data generator 3Mb is formed by circuits such as hardware logic circuits or a CPU system such that, as shown in Table 3, a specific group of 4-bit data R, L, D, U including data indicative of the TH/TR selection communication mode and data generated at the operating portion 3Ma by the player's operation are supplied through the plug pin nos. 2, 3, 7, 8 in response to, in Table 3, the 1st to 4th rows of bit patterns of both the peripheral selection signal TH and data request signal TR.

Figure 6B:
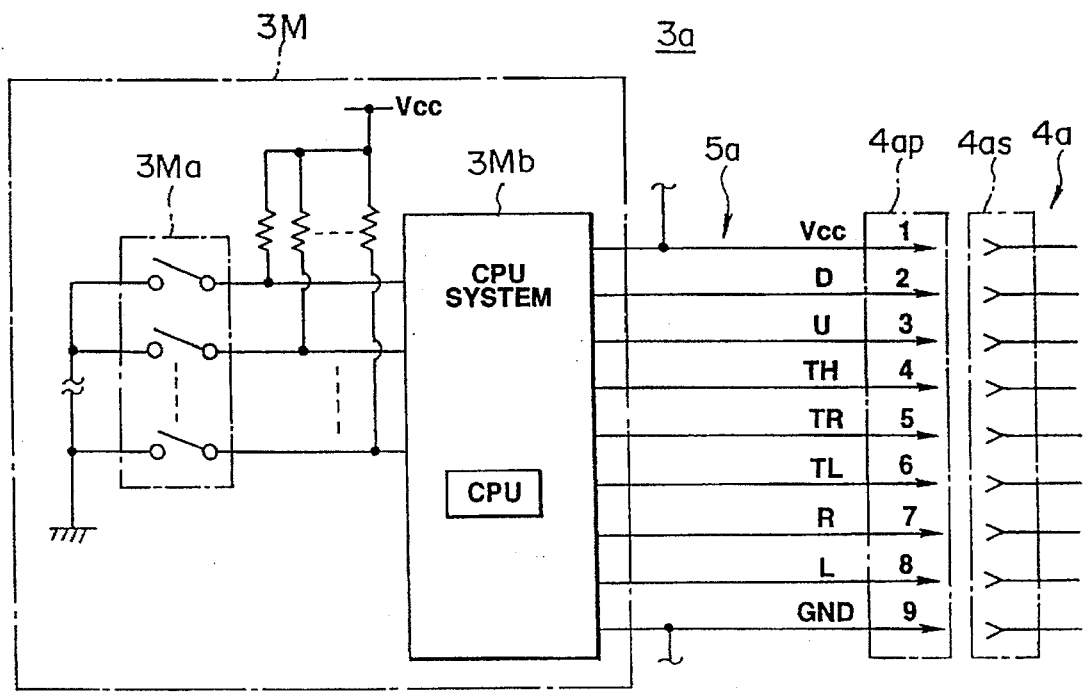
Figure 12:
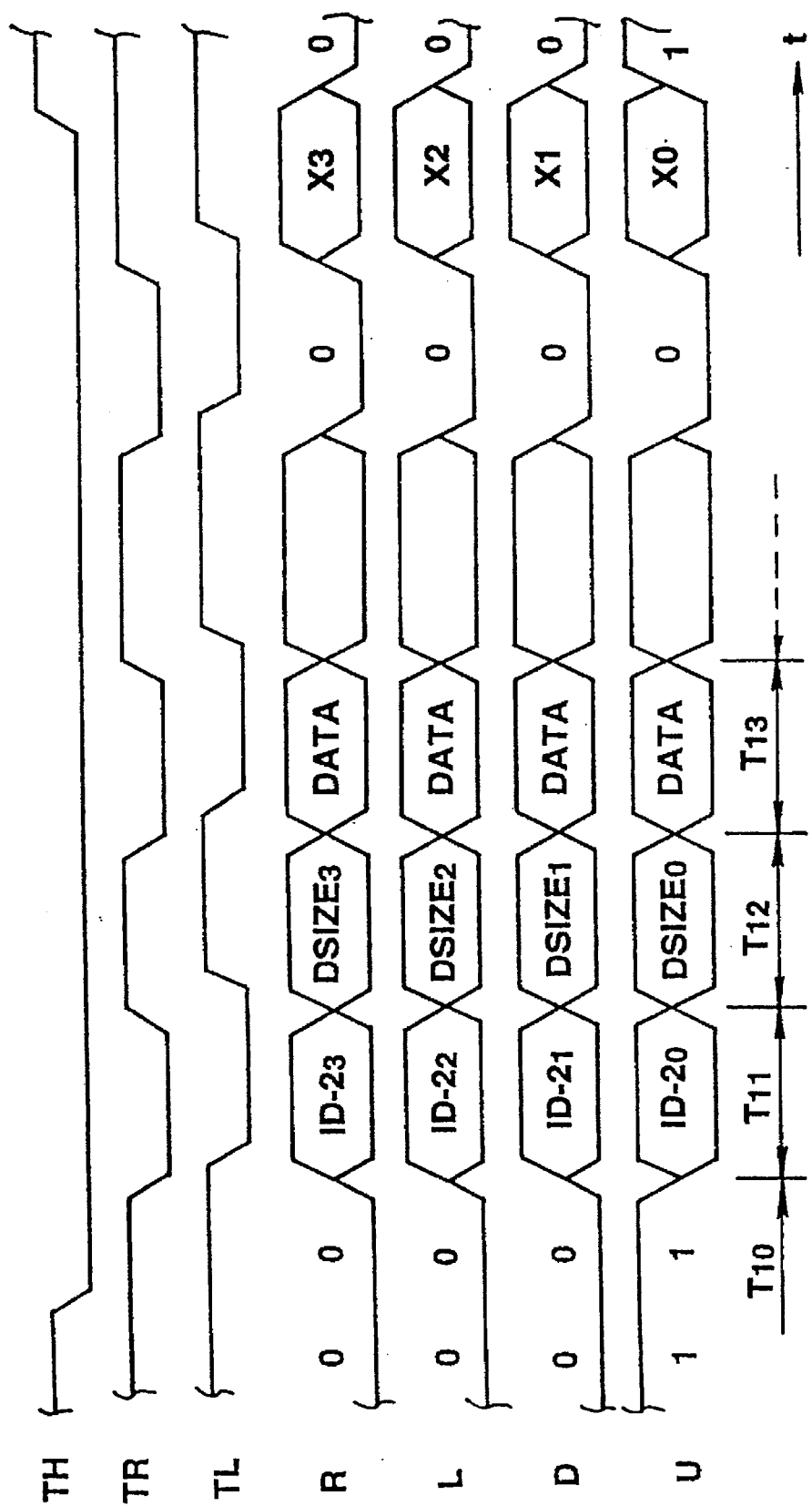
FIG. 12 represents a timing chart of control signals and data for the three-wire handshake type of communication mode.

FIG. 6B shows a controller 3a employing the three-wire handshake communication mode. The controller 3a comprises the plug connector 4ap, the cable 5a having nine wires connected to the nine plug pin nos. 1 to 9 of the plug connector 4ap, and a main circuit 3M to which the wires of the cable 5a are connected. The nine plug pins 1 to 9 are electrically independent from each other and individually connected to the nine wires of the cable 5a. The main circuit 3M has an operating portion 3Ma and a CPU system 3Mb. The CPU system 3Mb has a CPU and functions as a data generator which is responsive to the switching operation of the operating portion 3Ma manipulated by the operator. The data generator formed by hardware logic circuits can be adopted as a substitute for the CPU system. The CPU system 3Mb communicates with the game apparatus 2 using the three signals TH, TR, and TL sequentially inputted or outputted through the plug connector 4ap and then supplies, as shown in FIG. 12 and Table 4, 4-bit parallel data R, L, D, U including data indicative of the three-wire handshake communication mode and data generated at the operating portion 3Ma by the player's operation of the game apparatus 2 through the plug connector 4ap. When output signals from an operating portion 3Ma are analog quantities, the operating portion 3Ma includes signal processing circuits such as an A/D convertor.

Figure 6C:
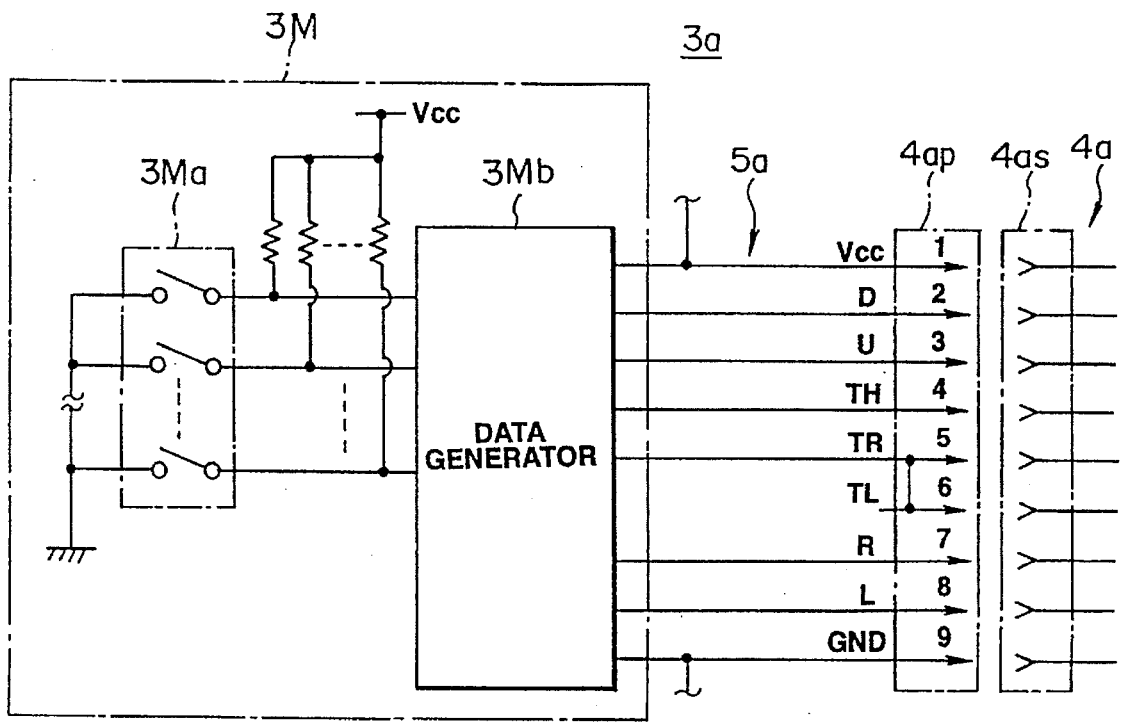
Figure 13:
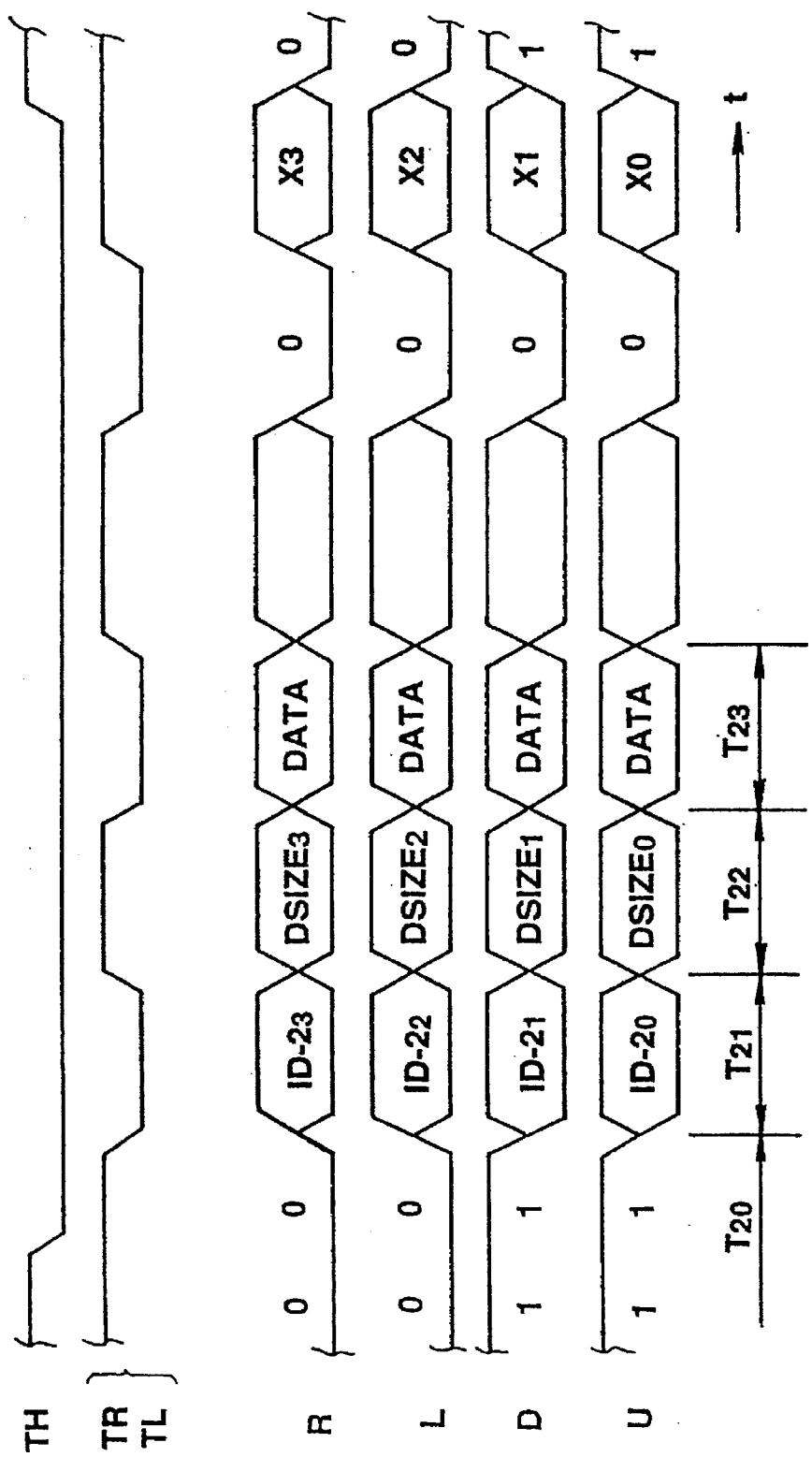
FIG. 13 represent a timing chart of control signals and data for the clocked parallel type of communication mode.

FIG. 6C shows a controller 3a employing the clocked parallel communication mode. The controller 3a also comprises the plug connector 4ap of nine pin nos. 1 to 9, the cable 5a, and a main circuit 3M. Among the nine plug pin nos. 1 to 9, the pins of nos. 5 and 6 are short-circuited at their pin portions to each other and the remaining pins are still electrically independent. The plug pins of Nos. 1 to 5 and 7 to 9 are coupled with the respective wires of the cable 5a. The main circuit 3M has an operating portion 3Ma and a data generator 3Mb which can be constructed using gate array circuits, for example. The main generator 3Mb, through the plug connector 4ap sequentially receives the peripheral selection signal TH and data request signal TR. In response to the reception of the signal TR, the data generator 3M*b* supplies to the game apparatus 2, as shown in FIG. 13 and Table 4, 4-bit parallel data including data indicative of the clocked parallel communication mode and data generated at the operating portion 3M*a* by the player's operation. As the pin No. 6 is short-circuited to the pin No. 5, the potential equal to the signal TR is conducted to the game apparatus in place of the peripheral acknowledgment signal TL. The plug pin configuration of this mode reduces the number of wires of the cable 5*a* by one, as shown in FIG. 6C. The clocked parallel communication mode permits the game apparatus 2 to communicate with the controller 3*a* in the same manner as, but with a faster response than, the three-wire handshake mode.

Figure 6D:
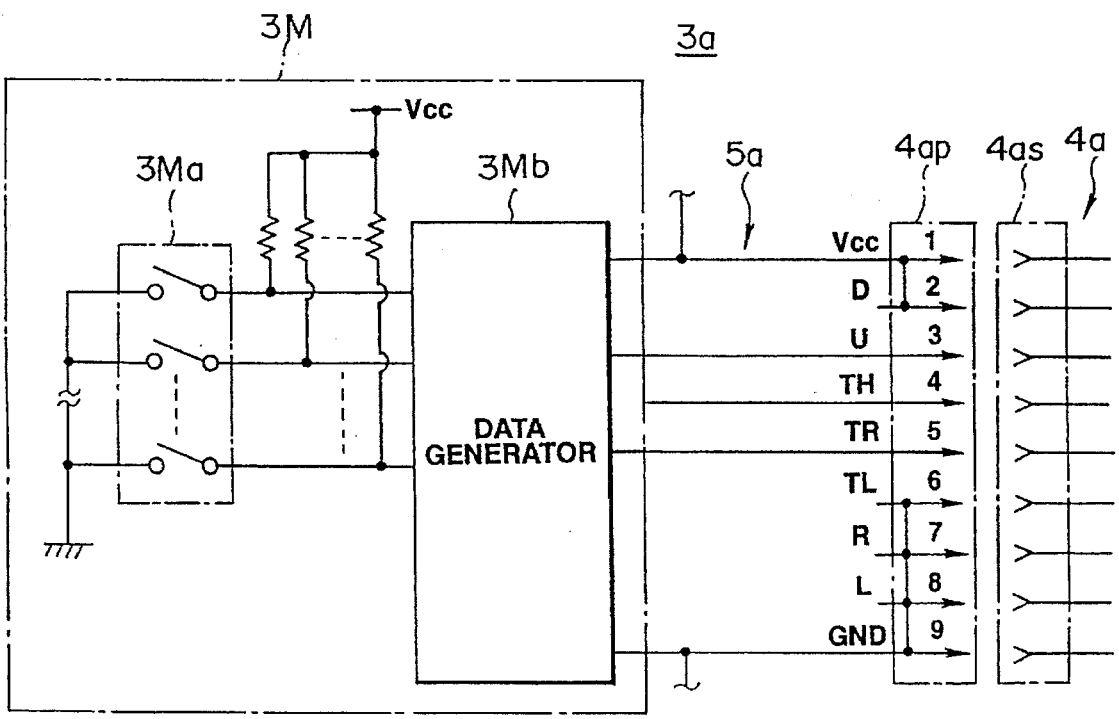
Figure 14:
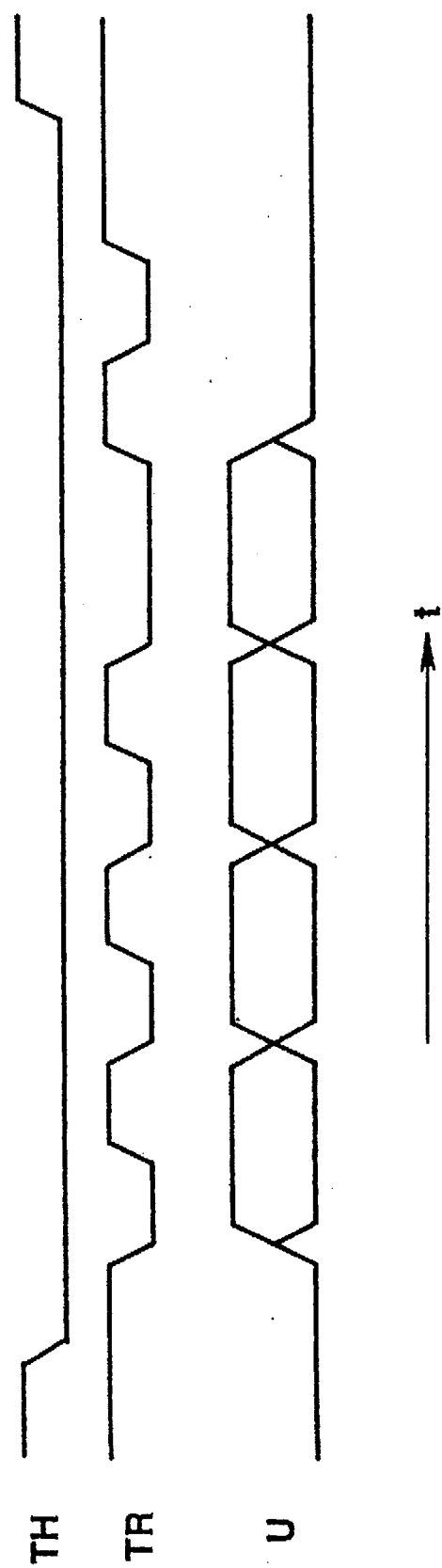
FIG. 14 is a timing chart of control signals and data for the clocked serial type of communication mode.

FIG. 6D shows a controller 3*a* employing the clocked serial communication mode. The controller 3*a* also comprises the plug connector 4*ap* of nine pins of nos. 1 to 9, the cable 5*a*, and a main circuit 3M. Among the nine plug pins of nos. 1 to 9, the pins of nos. 1 and 2 are short-circuited and the pins of nos. 6 to 9 are short-circuited, respectively, at their pin portions to each other and the remaining pins are still electrically independent. The plug pins of nos. 1, 3 to 5, and 9 are coupled with the respective wires of the cable 5*a*. The main circuit 3M has an operating portion 3M*a* and a data generator 3M*b* which can be constructed using gate array circuits, for example. The data generator 3M*b*, through the plug connector 4*ap*, sequentially receives the peripheral selection signal TH and data request signal TR. The data generator 3M*b* together with the pin configuration supplies to the game apparatus 2, as shown in FIG. 14 and Table 4, data indicative of a clocked serial communication mode and then, in response to clock pulse inversion, supplies to the game apparatus 2 serial data including data generated at the operating portion 3M*a*. The plug pin configuration of this mode remarkably reduces the number of wires of the cable 5*a* by four, as shown in FIG. 6D.

In FIGS. 6C and 6D, such short-circuit configuration can be achieved in the side of the main circuit 3M.

In the present embodiment, when the plug 4*ap* (or 4*bp*) connected to the controller 3*a* (or 3*b*) is inserted into the socket 4*as* (or 4*bs*) arranged in the apparatus 2, the foregoing plug pin configurations permit the sub CPU 25 to communicate to process in the order of "peripheral ID-1", "peripheral ID-2", "data size", and "data", even though the controller 3*a* (or 3*b*) as the peripheral device adopts different communication modes or different device types. Also the foregoing plug pin configuration provides the communication of "peripheral IDs" and "data" in a proper state, although types and/or communication modes of peripheral devices are different.

The operation of the apparatus 2 functionally including the system for identifying communication modes of peripheral devices will now be explained with reference to FIGS. 3 to 14 and Table 2 to 6.

Figure 7:
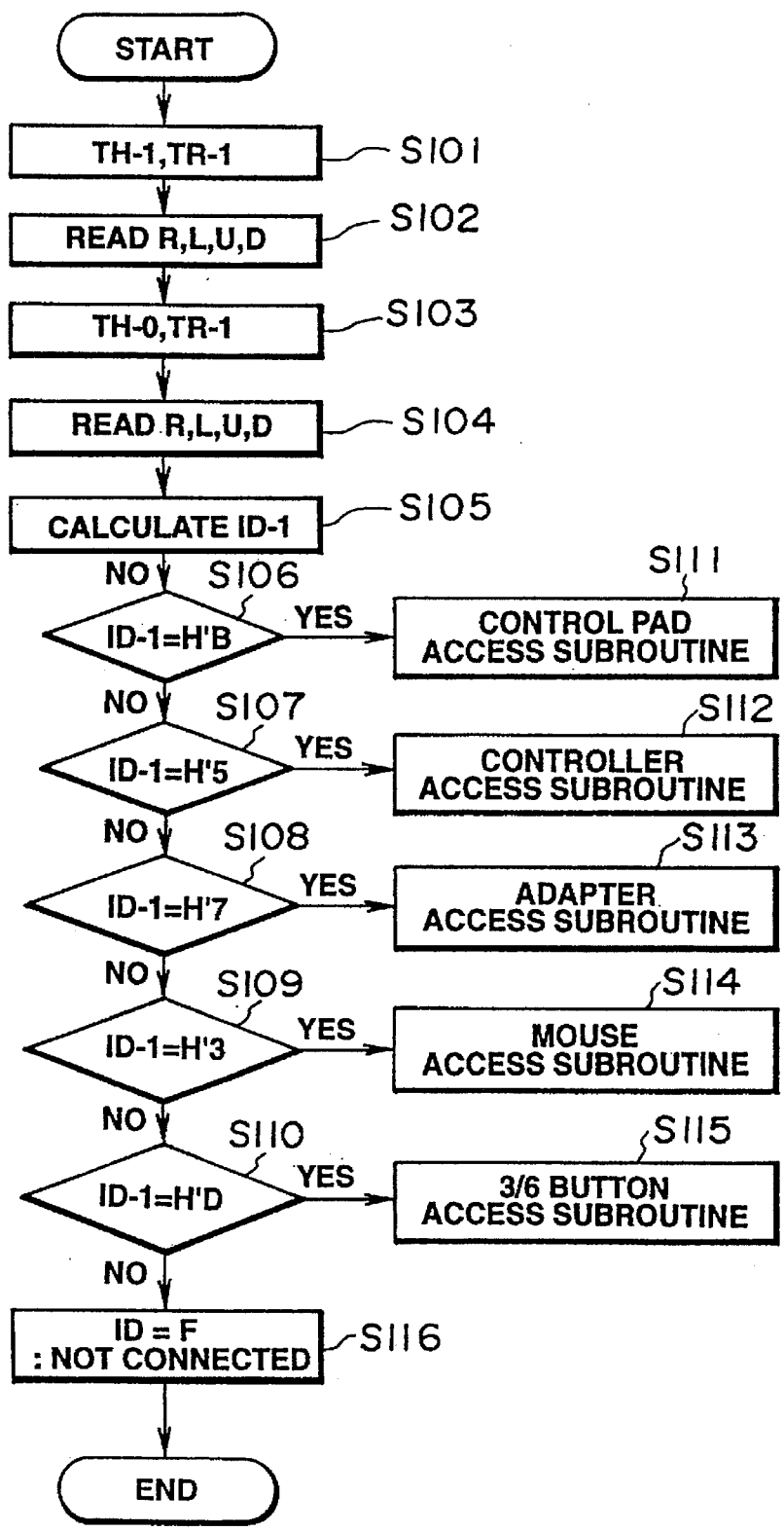
FIG. 7 is a flowchart exemplifying a processing carried out by the sub CPU.

As shown in FIG. 7, after being activated, the sub CPU 25 first outputs the control signals TH="1" and TR="1" (refer to Step S101 in FIG. 7). The CPU core 31 of the sub CPU 25 reads logical values of the data signals R, L, D and U produced on pins 7, 8, 2 and 3 by each of the peripheral devices and stores the read logical values into a predetermined memory area of the RAM 33 (Step S102). The CPU core 31 again outputs the control signals TH="0" and TR="1" (Step S103). In response to this, the CPU core 31 again reads logical values of the data signal R, L, D and U produced by the peripheral devices and stores them into a predetermined memory area of the RAM 33 (Step S104: see the intervals $T_{10}$ in FIG. 12 and $T_{20}$ in FIG. 13).

The CPU core 31 then calculates the "peripheral ID-1" (Step S105). The "peripheral ID-1" can be calculated using the following formula.

[ID-1] = {(data R in TH="1") or (data L in TH="1")} × 8h +
{(data D in TH="1") or (data U in TH="1")} × 4h +
{(data R in TH="0") or (data L in TH="0")} × 2h +
{(data D in TH="0") or (data U in TH="0")} × 1h where h represents suffix for hexadecimal number. Using the calculated results of [ID-1], the CPU core 31 identifies the types of peripheral devices (Steps S106 to S110). The following table 2 shows a relation between the types of peripheral devices and the calculated results of [ID-1].

| Peripheral Device | ID-1 |
| --- | --- |
|  | F |
|  | E |
| 3/6 Button | D |
|  | C |
| Control PAD | B |
|  | A |
|  | 9 |
|  | 8 |
| Adaptor | 7 |
|  | 6 |
| Controller (Peripheral #1) | 5 |
|  | 4 |
| Mouse | 3 |
|  | 2 |
|  | 1 |
| Modem | 0 |

In detail, the CPU core 31 first determines whether or not the calculated result [ID-1] is Bh, for instance. When it is determined that the calculated result [ID-1] be Bh (YES at Step S106), it is decided that the peripheral device be a control PAD packed and supplied together with the game system as a standard peripheral device. According to the present embodiment, the hexadecimal value Bh or the binary number "1011" of [ID-1] is assigned to the standard control pad. The values of [ID-1] other than Bh may be assigned to other optional peripheral devices as shown in Table 2. Thus the CPU core 31 which has determined the value Bh of [ID-1] moves to the processing of a control PAD access subroutine (Step S111). When the calculated result [ID-1] is not Bh (NO at Step S106), the CPU core 31 then determines whether or not the calculated result [ID-1] is 5h, for example (Step S107).

Figure 8:
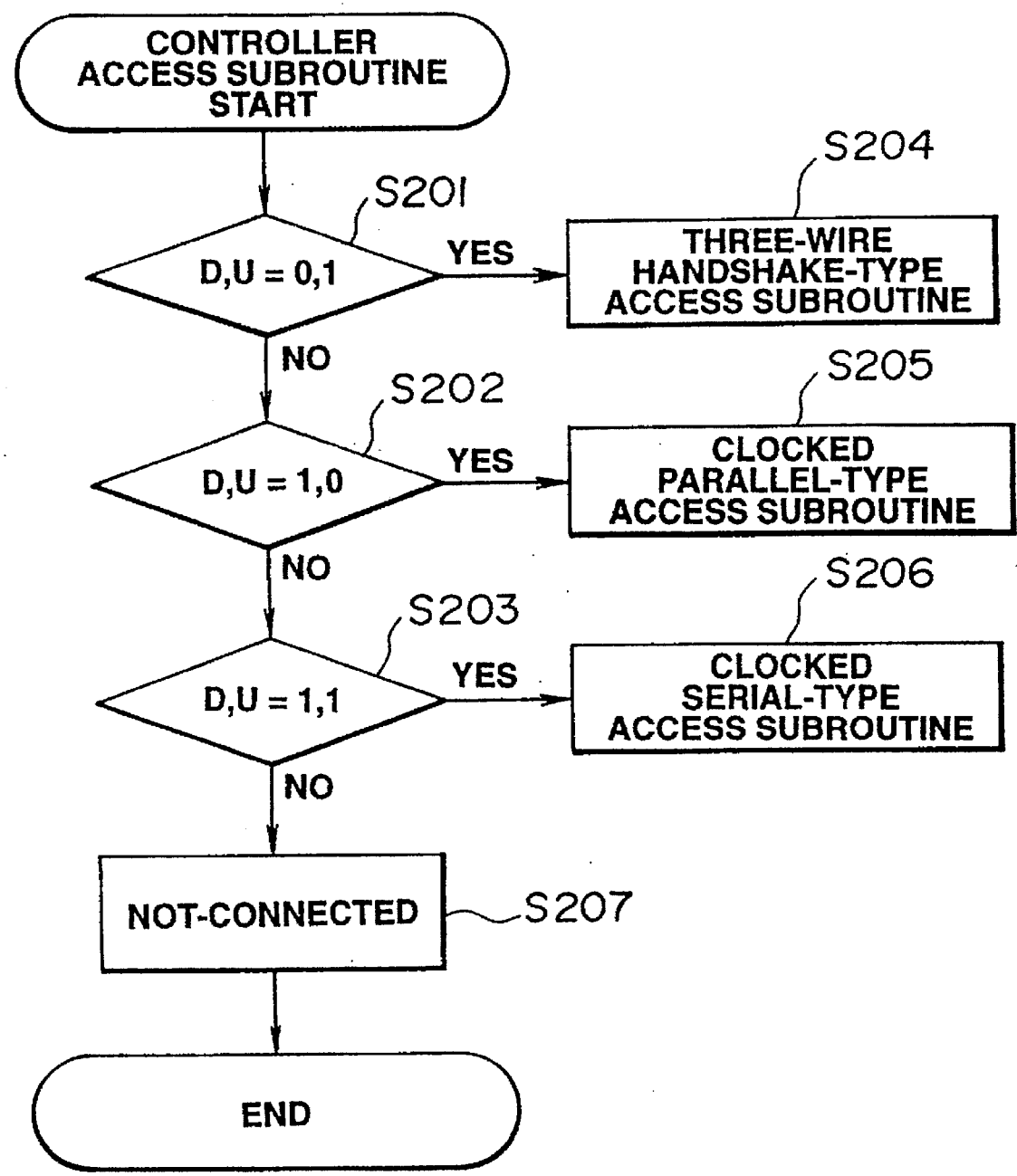
FIG. 8 is a flowchart of an access subroutine to peripheral devices.

When it is determined that the calculated result [ID-1] be 5h (YES at Step S107, also refer to Table 2), a controller access subroutine is processed (Step S112), which is shown in detail in FIG. 8.

When the calculated result [ID-1] is not 5h (NO at Step S107), the sub CPU 25 proceeds to the determination whether the calculated result [ID-1] is 7h, for example (Step S108). When the determination is YES at Step S108 (i.e., the calculated result [ID-1]=7h), the sub CPU 25 then performs an adapter access subroutine (Step S113).

When it is determined that the calculated result [ID-1] be not 7h (NO at Step S108), the sub CPU 25 continues to determine if the above calculated result [ID-1] is 3h or not, for example (Step S109). Where the calculated result [ID-1] is determined to be 3h (YES at Step S109, Table 2), a mouse access subroutine is processed (Step S114).

When the above result [ID-1] is not 3h (NO at Step S109), it is then determined whether or not the calculated result

[ID-1] be Dh (Step S110). Where this determination shows that the calculated result [ID-1] is Dh (YES at Step S110, Table 2), a ⅜ button access subroutine is then performed (Step S115). When the determination is NO at Step 110, the processing is continued to Step S116, where a decision that the peripheral device is not connected is made for the calculated result [ID-1]=Fh and a decision to be unknown is made for values of the [ID-1] other than the above exemplified results (refer to Table 2).

As a representative, the control PAD access subroutine will be described. In this subroutine, an access to the control PAD is carried out under the TH/TR communication mode automatically designated. In the present embodiment, the TH/TR selection communication mode is preferably employed in the standard control pad supplied together with the game apparatus 2. In other words, the game apparatus is constructed so that, when the calculated result of [ID-1] is determined as Bh, it automatically determines that the peripheral device connected is a standard control pad with a TH/TR selection communication mode.

In this communication mode, a control signal of 2-bit data consisting of combined two signals of the peripheral selection signal TH and data request signal TR is transmitted from the game apparatus to the control pad (peripheral controller). Then, in response to the 2-bit data of the combined control signal of TH and TR, the control pad transmits four patterns of combined 4-bit data R, L, D and U in a sequence of antecedent first to fourth rows, for example, as shown in Table 3.

Table 3 is a truth table of values required for a TH/TR selection communication mode in which the "RIGHT", "LEFT", "DOWN", "UP", "START", and "TRG-A, B, C, X, Y, Z, L, R" are names of the key switches of the control pad or signal names generated by the key switches, respectively.

In the first step of the sequence, as shown in Table 3, the control pad outputs a four bit data of "TRG-L", "1", "0" and "0" via terminal pins R, L, D and U to the game apparatus 2, which data corresponds to the first two lines of the formula of [ID-1] as explained hereinabove. With this data the game apparatus calculates the upper 2-bit of [ID-1]. The first line of the formula makes "1" irrelevant to the value of "TRG-L" when the values (data R="TRG-L") and (data L="1") in TH="1" are applied to the formula. The second line of the formula yields "0" when the values are (data D="0") and (data U="0") in TH="1".

In the second step of the sequence, similarly, the control pad outputs a four bit data of (R="RIGHT" in TH="0"), (L="LEFT" in TH="0"), (D="DOWN" in TH="0") and (U="UP" in TH="0") via terminal pins R, L, D and U to the game apparatus 2, which data correspond to the second two lines of the formula of [ID-1]. With this data the game apparatus calculates the lower 2-bit of [ID-1]. Both of the third and fourth lines of the formula yield "1" because there never occurs a case where both keys of "RIGHT" and "LEFT" generate ON simultaneously and a case where both keys of "DOWN" and "UP" generate ON simultaneously.

Thus a calculation result of [ID-1]=binary 1011 or hexadecimal Bh is obtained and based on the calculation result the game apparatus 2 determines that the connected peripheral device is a standard pad with a TH/TR selection communication mode.

The game apparatus 2 receives signal data indicative of switches TRG-A, B, C, X, Y, Z, L and R in the third and fourth rows of the bit sequences as shown in Table 3 via terminal pins R, L, D and U in response to the combined 2-bit control signal of TH and TR. Thus during one sequence cycle of 1st to 4th steps the game apparatus collects data necessary for determining the type of a peripheral device and the mode of communication as well as data indicative of all key switches.

Data of the peripheral acknowledgment signal TL are ignored in the TH/TR selection communication mode since a required voltage level at terminal pin TL (no. 6 pin) is always "1" in all four steps of the sequence as shown in Table 3, which is equivalent to a status that the voltage value of the power source Vcc is always applied to the pin.

TABLE 3

| DATA | TH | TR | TL | R | L | D | U |
|---|---|---|---|---|---|---|---|
| | bit6 INPUT | bit5 INPUT | bit4 OUTPUT | bit3 OUTPUT | bit2 OUTPUT | bit1 OUTPUT | bit0 OUTPUT |
| 1st | 1 | 1 | 1 | TRG-L | 1 | 0 | 0 |
| 2nd | 0 | 1 | 1 | RIGHT | LEFT | DOWN | UP |
| 3rd | 1 | 0 | 1 | START | TRG-A | TRG-C | TRG-B |
| 4th | 0 | 0 | 1 | TRG-R | TRG-X | TRG-Y | TRG-Z |

As another representative, the foregoing controller access subroutine shown in FIG. 8 will now be described also with reference to Table 4 which represents the bit patterns of data R, L, D and U corresponding to typical communication modes used by controllers as peripheral devices.

TABLE 4

| Communication mode | TH=1 TR=1 | | | | TH=0 TR=1 | | | |
|---|---|---|---|---|---|---|---|---|
| | R | L | D | U | R | L | D | U |
| Three-wire handshake | 0 | 0 | 0 | 1 | 0 | 0 | 0 | 1 |
| Clocked serial | 0 | 0 | 1 | 0 | 0 | 0 | 1 | 0 |
| Clocked parallel | 0 | 0 | 1 | 1 | 0 | 0 | 1 | 1 |

In this access subroutine, the CPU core 31 of the sub CPU 25 first determines communication modes by a series of Steps S201 to S203 on the basis of the logical values of the data D and U acquired before. When both the data D is "0" and U is "1" (YES at Step S201), the peripheral device is identified as in the three-wire handshake mode (refer to Table 4), and the processing by the sub CPU 25 proceeds to a three-wire handshake-type access subroutine (Step S204).

When the data D and U are not "0" and "1", respectively (NO at Step S201), the CPU core 31 then determines whether both of the data D and U are "1" and "0", respectively, for example (Step S202). When the determination is YES at Step S202 (i.e., D="1" and U="0", refer to Table 3), the CPU core 31 continues to an access subroutine of the clocked serial communication mode (Step S205).

Furthermore, where the determination is NO at Step S202 (i.e., data D is not "1" and data U is not "0"), the CPU core 31 determines whether or not the data D is "1" and data U is "1" (Step S203). When being determined that D="1" and U="1" (YES at Step S203, refer to Table 4), the CPU core 31 performs an access subroutine of the clocked parallel communication mode (Step S206).

When the CPU core cannot find the positive answers at any of the above determination processes at Steps S201 to S203 (NO at Steps S201 to S203), it is then determined that no peripheral device is connected to the apparatus 2 (Step S207), and this subroutine is ended.

Each access subroutine shown at the above Steps S204 to S206 will now be explained in detail.

Figure 9:
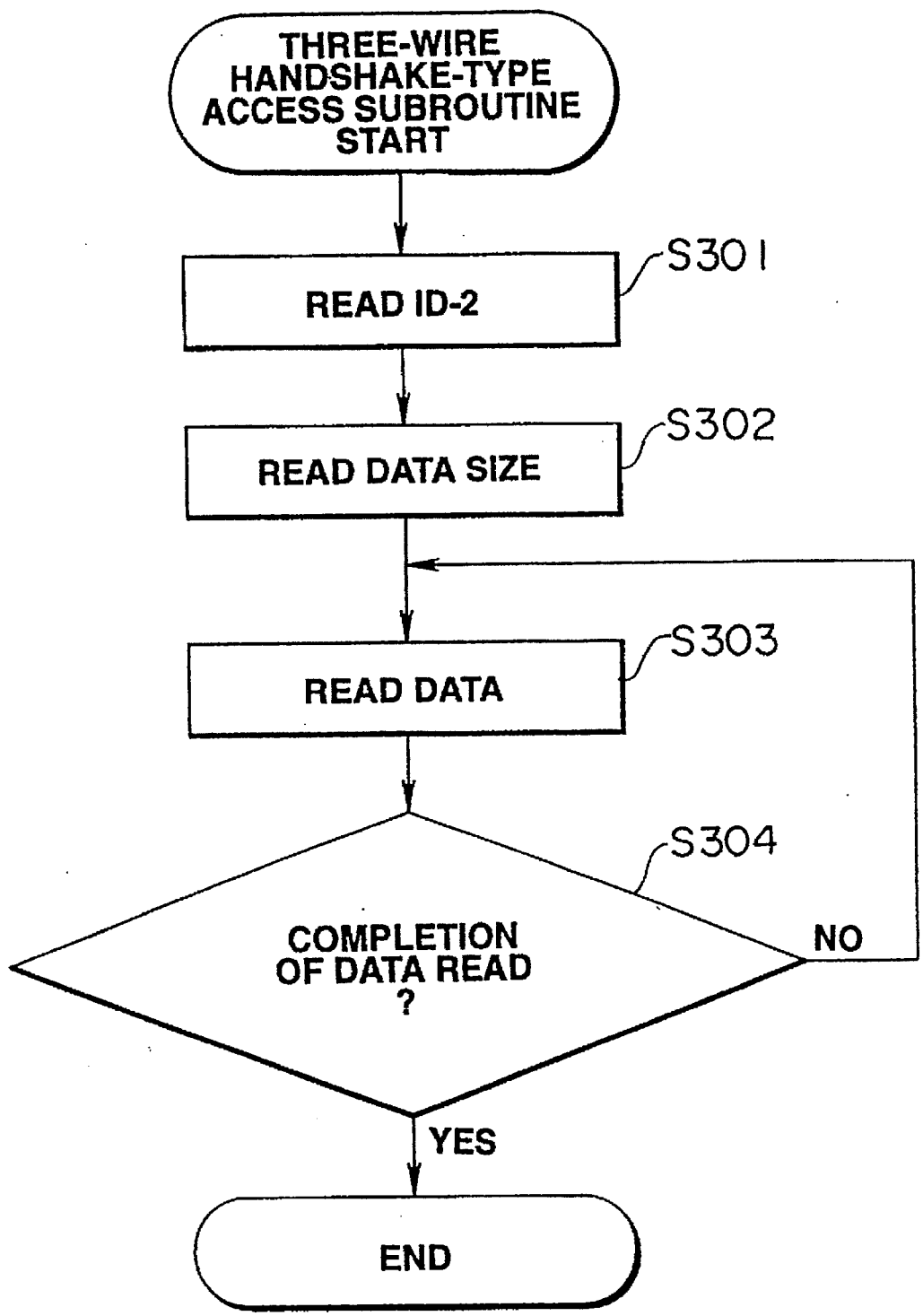
FIG. 9 shows a flowchart of an access subroutine for a three-wire handshake type of communication mode.

First, the access subroutine of the three-wire handshake communication mode, which is shown in FIG. 9, will be explained using the timing chart of each signal shown in FIG. 12 in which the reference t shows time.

During the interval $T_{11}$ in FIG. 12, the CPU core 31 reads the "peripheral ID-2" (Step S301 in FIG. 9). In other words, the data ID-$2_3$, ID-$2_2$, ID-$2_1$ and ID-$2_0$ of R, L, D and U are taken in by the CPU core 31 during the interval $T_{11}$ and it is determined whether each of those data ID-$2_3$ to ID-$2_0$ corresponds to any of "0h" to "Fh" (refer to IDs shown in Table 5).

TABLE 5

| Peripheral Device | ID-2 | Remarks |
|---|---|---|
| Digital device | 0 | Control PAD, joystick etc. |
| Analog device | 1 | Analog joystick etc. |
| Pointing device | 2 | Mouse, tablet etc. |
| Keyboard | 3 | Keyboard etc. |
| Multitap | 4 | Multitap etc. |
|  | 5 |  |
|  | 6 |  |
|  | 7 |  |
|  | 8 |  |
|  | 9 |  |
|  | A |  |
|  | B |  |
|  | C |  |
|  | D |  |
| Peripheral #2 | E | ID for conversion |
|  | F | for non-connection |

In addition to the reading, the CPU core 31 looks up Table 5 for each value of the read peripheral ID-2. For example, the CPU core 31 determines that the peripheral device be a digital device for "peripheral ID-2"=0h, an analog device for "peripheral ID-2"=1h, a pointing device for "peripheral ID-2"=2h, a key board for "peripheral ID-2"=3h, and so on.

After such determination, the CPU core 31 reads the data size during the next interval $T_{12}$ (Step S302). Namely, as shown in FIG. 12, data DSIZE0 to DSIZE3 of R, L, D and U are taken in for deciding the data size.

The CPU core 31 then reads the data during the following intervals starting from interval $T_{13}$ in FIG. 12 (Step S303). It is then determined whether the amount of the read data reaches the data size (Step S304). If the determination is NO, the processing returns to Step S303 to read the data again. However, the determination is YES at Step S304 (i.e., the data amount that has been read by then reaches the determined data size), this subroutine is ended.

Next, the access subroutine of the clocked parallel communication mode identified at Step S205 in FIG. 8 will now be explained using FIGS. 10 and 13.

FIG. 13 shows the timing chart of the clocked parallel communication mode, which is almost the same as that shown in FIG. 12. Only one difference is that both of the signals TR and TL always change at the same timing.

Figure 10:
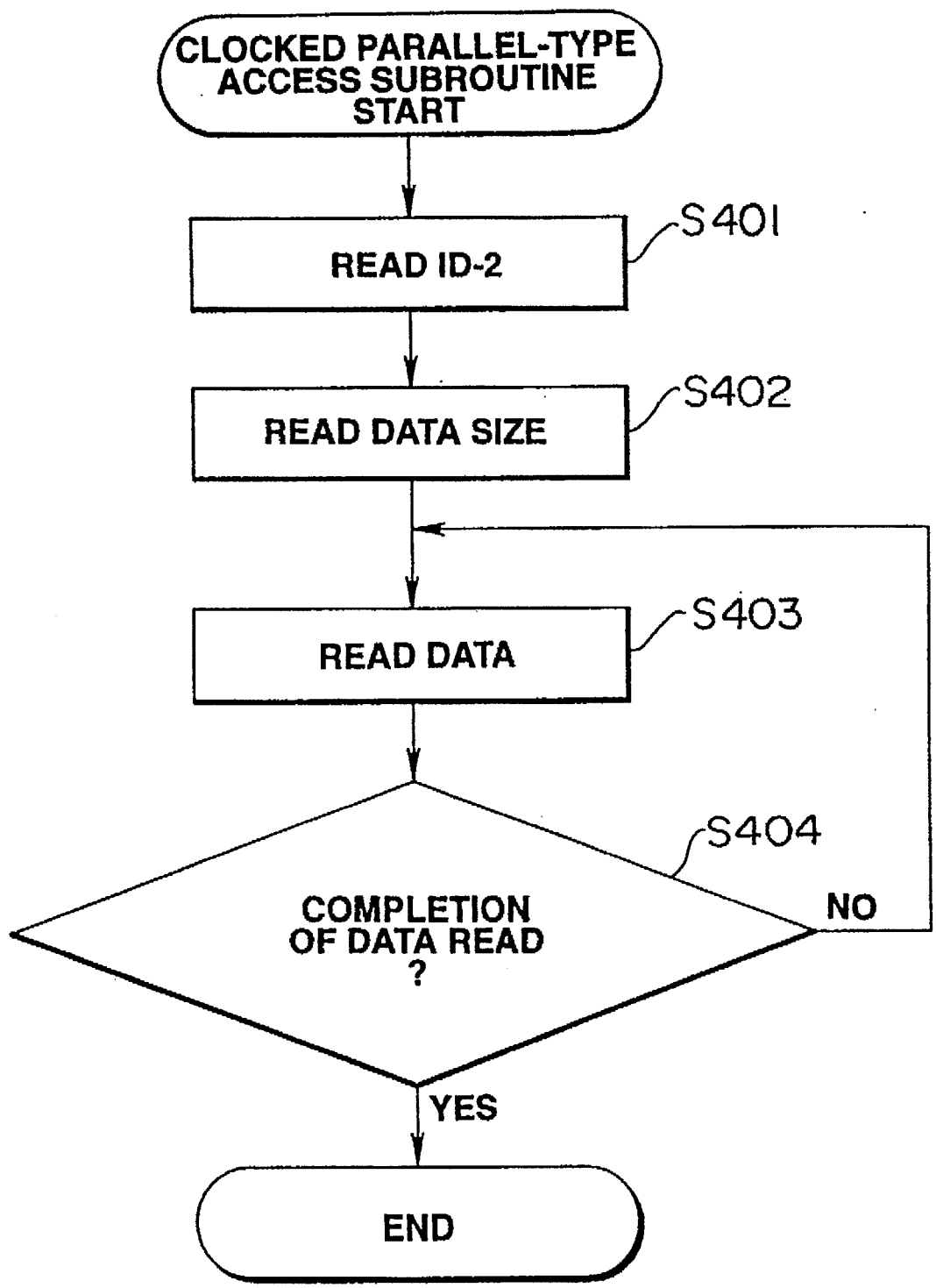
FIG. 10 shows a flowchart of an access subroutine for a clocked parallel type of communication mode.

First, the CPU core 31 reads the "peripheral ID-2" during the interval $T_{21}$ in FIG. 13 (Step S401 in FIG. 10).

In detail, the data ID-$2_3$, ID-$2_2$, ID-$2_1$ and ID-$2_0$ of R, L, D and U are taken in by the CPU core 31 during the interval $T_{21}$ and it is determined whether each of the data ID-$2_3$ to ID-$2_0$ corresponds to any of "0h" to "Fh" (refer to IDs shown in Table 5). The CPU core 31 looks up Table 5 for each value of the read peripheral ID-2. For example, the CPU core 31 determines that the peripheral device is a digital device for "peripheral ID-2"=0h, an analog device for "peripheral ID-2"=1h, a pointing device for "peripheral ID-2"=2h, a key board for "peripheral ID-2"=3h, and so on.

After this, during the next interval $T_{22}$, the CPU core 31 reads the data size by receiving data DSIZE0 to DSIZE3 of R, L, D, U as shown in FIG. 13 (Step S402 in FIG. 10).

The CPU core 31 then reads the data during the following intervals starting from interval $T_{23}$ in FIG. 13 (Step S403). It is then determined whether the amount of the read data reaches the data size (Step S404). If the determination is NO, the processing returns to Step S403 to read the data again. However, if the determination is YES at Step S404 (i.e., the data amount that has been read by then reaches the determined data size), this subroutine is ended.

Figure 11:
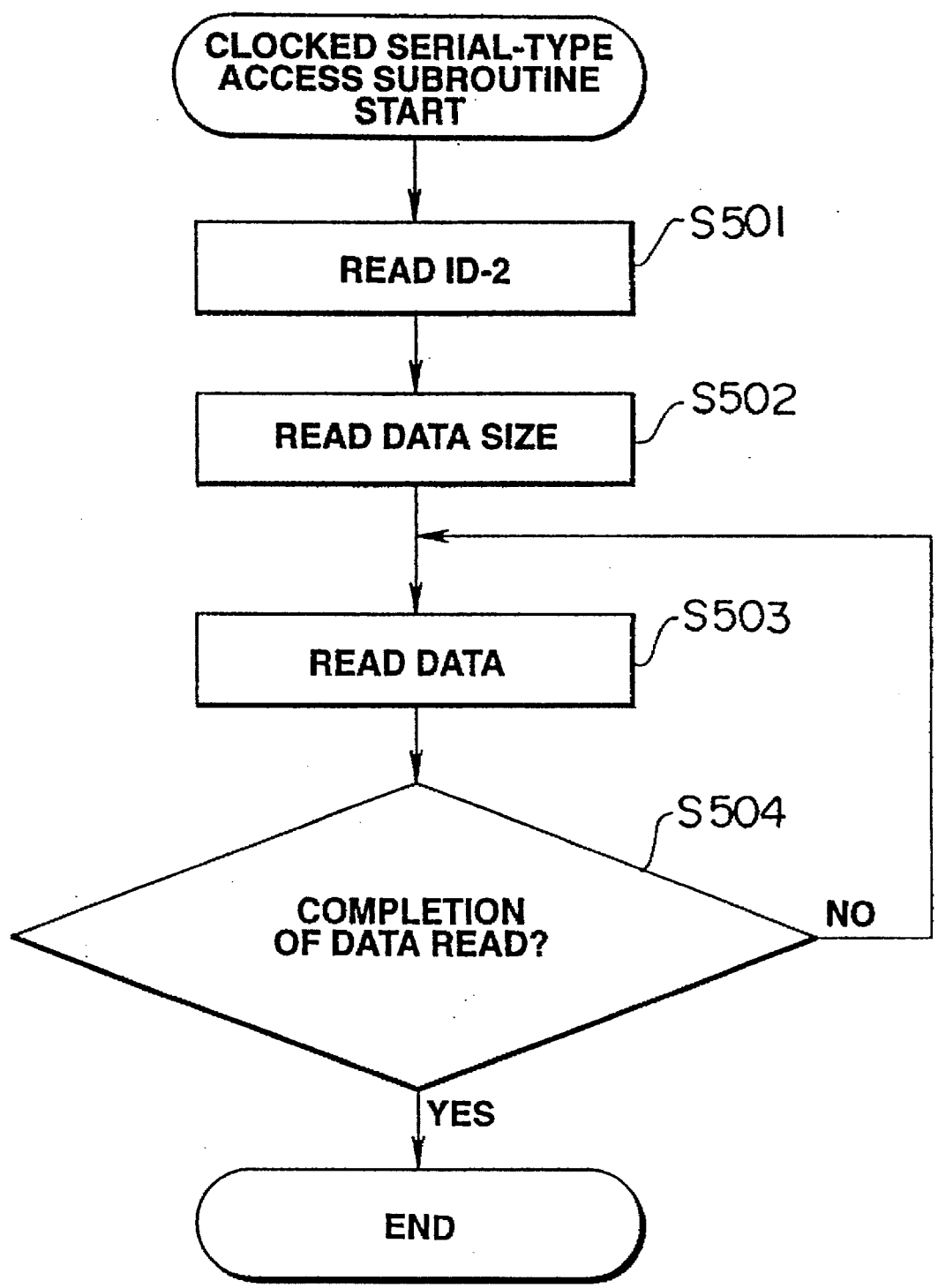
FIG. 11 is a flowchart of an access subroutine for a clocked serial type of communication mode.

Next, the access subroutine of the docked serial communication mode will be explained according to FIGS. 11 and 14 and Table 6. FIG. 14 exemplifies signal changes for the clocked serial mode, where the logical values of only the signals TH, TR and U are expressed along the elapsed time t.

This communication mode enables to obtain the data U only supplied from a peripheral device when the peripheral selection signal TH is "0" and at the same time, the data request signal TR is repeatedly "1" and "0", both the signals TH and TR being given to the peripheral device from the CPU core 31. The obtained data are exemplified in Table 6.

TABLE 6

| TH (input) | TR (input) | TL (GND) | R (GND) | L (GND) | D (Vcc) | U (DATA) | Remarks |
|---|---|---|---|---|---|---|---|
| 1 | 1 | 0 | 0 | 0 | 1 | 0 | ID-1(1st) |
| 0 | 1 | 0 | 0 | 0 | 1 | 0 | ID-2(2nd) |
| 0 | ↓ ↑ | 0 | 0 | 0 | 1 | $SMD_3$ |  |
| 0 | ↓ ↑ | 0 | 0 | 0 | 1 | $SMD_2$ |  |
| 0 | ↓ ↑ | 0 | 0 | 0 | 1 | $SMD_1$ |  |
| 0 | ↓ ↑ | 0 | 0 | 0 | 1 | $SMD_0$ |  |
| 0 | ↓ ↑ | 0 | 0 | 0 | 1 | ID-$2_3$ |  |
| 0 | ↓ ↑ | 0 | 0 | 0 | 1 | ID-$2_2$ |  |

TABLE 6-continued

| TH (input) | TR (input) | TL (GND) | R (GND) | L (GND) | D (Vcc) | U (DATA) | Remarks |
|---|---|---|---|---|---|---|---|
| 0 | ↓ ↑ | 0 | 0 | 0 | 1 | ID-$2_1$ | |
| 0 | ↓ ↑ | 0 | 0 | 0 | 1 | ID-$2_0$ | |
| 0 | ↓ ↑ | 0 | 0 | 0 | 1 | DSIZE$_3$ | |
| 0 | ↓ ↑ | 0 | 0 | 0 | 1 | DSIZE$_2$ | |
| 0 | ↓ ↑ | 0 | 0 | 0 | 1 | DSIZE$_1$ | |
| 0 | ↓ ↑ | 0 | 0 | 0 | 1 | DSIZE$_0$ | |
| 0 | ↓ ↑ | 0 | 0 | 0 | 1 | DATA$_7$ | |
| . | . . | . | . | . | . | . | |
| . | . . | . | . | . | . | . | |
| . | . . | . | . | . | . | . | |
| 0 | ↓ ↑ | 0 | 0 | 0 | 1 | DATA$_0$ | |
| 0 | ↓ ↑ | 0 | 0 | 0 | 1 | CCB | |
| 0 | ↓ ↑ | 0 | 0 | 0 | 1 | 1 | |
| 0 | ↓ ↑ | 0 | 0 | 0 | 1 | 1 | |
| 0 | ↓ ↑ | 0 | 0 | 0 | 1 | 0 | |
| 1 | 1 | 0 | 0 | 0 | 1 | 0 | End M5ID-1st |

As shown in Table 6, only when the peripheral selection signal TH is "0", the data request signal TR is repeated at cycles of "1" and "0" (expressed by upward and downward arrows in Table 6), the signal TL and data R and L are all "0", and the data D is "1", various data U including SMD$_3$ to SMD$_0$, ID-$2_3$ to ID-$2_0$, DSIZE$_3$ to DSIZE$_0$, and DATA$_7$ to DATA$_0$ are provided in sequence from the line U through the pin 3. Those data are read by the CPU core 31. Among them, the bit pattern of the data ID-$2_3$ to ID-$2_0$ are referred to the table 5 to decide the type of a connected peripheral device (Step S501 in FIG. 11).

The CPU core 31 reads the data size expressed by DSIZE$_0$ to DSIZE$_3$ (Step S502), so that the data size can be determined.

The data are then received by the CPU core 31 during predetermined intervals in a time sequence shown in FIG. 14 (Step S503). The amount of the read data are compared to the determined data size to determine whether the amount reaches the data size (Step S504). If the determination is NO, the processing returns to Step S503 to repeat the foregoing data read. The determination of YES at Step S504 allows to end this subroutine.

As explained above, the CPU core 31 exchanges signals with peripheral devices such that data "DATA" are inputted after information of "peripheral ID-1", "peripheral ID-2" and data size "DSIZE".

When the data are inputted into the CPU core 31, the CPU core 31 exchanges data with the main CPU 21 through the register table 34.

In the above embodiment, although the sub CPU 25 controls the peripheral devices, the main CPU 21 can also perform the above-described processing instead of the sub CPU 25, if the main CPU 21 is directly connected to the peripheral devices.

Further, another Identifying method of a communication mode can be used in the present invention. As is described above, the control signals TR and TL are equal in logical values (TR=TL) in the docked parallel communication mode and the logical values on only specified pins (D, U, R, L) are changed in specific manners. In case of the three-wire handshake mode, the control signals TR and TL are changed differently. This enables to calculate identification data of peripheral devices based on the pin configurations of the connectors and decide communication modes using the identification data.

Although the present invention has been described with reference to particular embodiments, the description is only an example of the invention's application and should not be taken as a limitation. In particular, the connector, the communication mode identifying system, and the peripheral device controlling system of the present invention is not limited to use with the game apparatus and can also be applied to any other system which use a processing unit and at least one peripheral device thereof.

What we claim is:

1. A peripheral device for use with a data processing apparatus having an interface means for communicating with a peripheral device with any of communication modes of a clocked parallel type, a clocked serial type, a three-wire handshake type and a TH/TR selection type, said interface means including a socket connector with a set of socket pins, comprising:

a plug connector detachably connectable to the socket connector, said plug connector having a set of plug pins disposed in a row and corresponding to the socket pins, said plug pins including a pair of first pins for connecting to fixed potentials, a plurality of second pins for conducting data signals, and a pair of third pins for receiving a control signal;

means for configuring said plurality of second pins to be indicative of a communication mode of the peripheral device; and a cable including a plurality of wires connecting the plug pins with terminals on a printed circuit board of said peripheral device;

said configuration means comprising means for supplying a data signal including identification data representing the communication mode of said peripheral device on said plurality of second pins in response to a first control signal supplied via said pair of third pins from said apparatus for requesting the identification data; and means for supplying said apparatus with a data signal including manipulation data via at least one of said plurality of second pins in response to a second control signal supplied from said apparatus via at least one of said pair of third pins.

2. A peripheral device for use with a data processing apparatus having a socket connector with a set of socket pins, comprising:

a plug connector detachably connectable to the socket connector, said plug connector having a set of plug pins disposed in a row and corresponding to the socket pins, said plug pins including a pair of first pins for connecting to fixed potentials, a plurality of second pins for conducting data signals, and at least one of third pins for receiving a control signal;

means for configuring said set of plug pins to be indicative of a communication mode of the peripheral device, said configuring means including means for short-circuiting selected ones of said plug pins; and a cable including a plurality of wires connecting the plug pins with terminals on a printed circuit board of said peripheral device, said configuration means further comprising means for supplying data signals including data representing the communication mode of said peripheral device on said plurality of second pins in response to a control signal supplied via at least one of said third pins from said apparatus.

3. The peripheral device of claim 2, wherein said plurality of second plug pins are no. 2, no. 3, no. 7 and no. 8 pins selected from no. 1 to no. 9 pins disposed in order in the row and said short-circuiting means is a means that short-circuits not only the no. 2 pin with the no. 1 pin composing one of the pair of first pins but also the no. 7 and no. 8 pins with the no. 9 pin composing a remaining one of the pair of first pins, the no. 1 and no. 9 pin receiving a power source and a ground potential as the fixed potentials, respectively.

4. A peripheral device for use with a data processing apparatus, said apparatus having a peripheral port with a set of terminal pins consisting of first to ninth pins disposed in a row, said first pin for conducting one of power source and ground potential, said ninth pin for conducting the other of the power source and the ground potential, said second, third, seventh and eighth pins for conducting data signals, said fourth and fifth pins for conducting control signals, said apparatus having means for determining a communication mode for communicating with a peripheral device connected to the peripheral port based on the data signals received on said second, third, seventh and eighth pins, said peripheral device comprising;

a plug connector detachably connectable to said peripheral port, said plug connector having a set of terminal pins consisting of first to ninth pins disposed in a row correspondingly to said first to ninth pins of the peripheral port;

a cable including a plurality of wires connecting ones of the terminal pins of said plug connector with a printed circuit board of said peripheral device;

means for supplying a data signal including data representing a communication mode of said peripheral device on said second, third, seventh and eighth pins in response to a control signal supplied via said fourth and fifth pins from said apparatus;

means for short-circuiting said second pin with said first pin of said plug connector;

means for short-circuiting said sixth to eighth pins with said ninth pin of said plug connector; and means for supplying a serial data signal to the apparatus via said third pin of said plug connector in synchronism with a clock signal supplied via the fifth pin while receiving a signal for selecting the peripheral device via the fourth pin.

5. A peripheral device for use with a data processing apparatus having an interface means with a peripheral port for communicating with a peripheral device with any of communication modes of a clocked parallel type, a clocked serial type, a three-wire handshake type and a TH/TR selection type, comprising:

a plug connector detachably connectable to said peripheral port, said plug connector having a set of terminal pins including first to ninth pins disposed in a row, said first pin for conducting one of a power source and ground potential, said ninth pin for conducting the other of the power source and the ground potential, said second, third, seventh and eighth pins for conducting data signals, said fourth and fifth pins for receiving control signals;

a cable including a plurality of wires connecting the terminal pins of said plug connector with terminals on a printed circuit board of said peripheral device;

means for supplying a data signal including identification data representing a communication mode of said peripheral device to the apparatus on said second, third, seventh and eighth pins in response to a control signal supplied from said apparatus for collecting the identification data via the fourth and fifth pins; and means for supplying said apparatus with a data signal including manipulation data via at least one of said second, third, seventh and eighth pins in response to a second control signal supplied from said apparatus via at least one of said fourth and fifth pins.

6. A peripheral device for use with a data processing apparatus, said apparatus having a peripheral port with a set of terminal pins consisting of first to ninth pins disposed in a row, said first pin for conducting one of a power source and ground potential, said ninth pin for conducting the other of the power source and the ground potential, said second, third, seventh and eighth pins for conducting data signals, said fourth and fifth pins for conducting control signals, said apparatus having an interface means for communicating with said peripheral device with any of communication modes of a clocked parallel type, a clocked serial type, a three-wire handshake type and a TH/TR selection type and for determining which one of the communication modes to use for communicating with said peripheral device connected to the peripheral port based on the data signals received on said second, third, seventh and eighth pins, said peripheral device comprising:

a plug connector detachably connectable to said peripheral port, said plug connector having a set of terminal pins consisting of first to ninth pins disposed in a row correspondingly to said first to ninth pins of the peripheral port;

a cable including a plurality of wires connecting ones of the terminal pins of said plug connector with a printed circuit board of said peripheral device;

means for supplying a data signal including identification data representing the communication mode of said peripheral device on said second, third, seventh and eighth pins in response to a first control signal supplied from said apparatus for requesting the identification data via the fourth and fifth pins; and means for supplying said apparatus with a data signal including manipulation data via at least one of said second, third, seventh and eighth pins in response to a second control signal supplied from said apparatus via at least one of said fourth and fifth pins.

7. The peripheral device of claim 6, wherein said second control signal supplied via said fourth pin includes a signal for selecting the peripheral device, and wherein said peripheral device further comprises means for transmitting an acknowledgment signal to the apparatus via said sixth pin of said plug connector and means for supplying the manipulation data signal to the apparatus via said second, third, seventh and eighth pins of said plug connector while receiving the signal for selecting the peripheral device.

8. The peripheral device of claim 6, wherein said second Control signal supplied via said fourth and fifth pins includes a signal for selecting the peripheral device and a clock signal, and wherein said peripheral device further comprises means for short-circuiting said sixth pin with said fifth pin of said plug connector and means for supplying the manipulation data signal to the apparatus in parallel via said second, third, seventh and eighth pins of said plug connector in synchronism with the clock signal while receiving the signal for selecting the peripheral device.

9. The peripheral device of claim 6, wherein said interface means includes means for having parallel access to the identification data provided on the second, third, seventh and eighth pins of the peripheral port.

10. A peripheral device for a game apparatus having an interface means for communicating with a peripheral device with any of communication modes of a clocked parallel type, a clocked serial type, a three-wire handshake type and a TH/TR selection type, said interface means having a socket connector with a set of nine (9) socket pins, said peripheral device comprising:
- a plug connector detachably connectable to the socket connector, said plug connector having a set of nine (9) plug pins disposed in a row from first to ninth plug pins corresponding to said socket pins;
- means for receiving via the first and the ninth plug pins a power source potential and ground potential, respectively;
- means for supplying the game apparatus with a data signal including identification data representing a three-wire handshake type communication mode in response to a first control signal including a first control data combination of "1" to the fourth plug pin and "1" to the fifth plug pin and a second control data combination of "0" to the fourth plug pin and "1" to the fifth plug pin supplied from the game apparatus, said identification data including a data combination of "0" to the seventh plug pin, "0" to the eighth plug pin, "0" to the second plug pin and "1" to the third plug pin, wherein "1" and "0" correspond to the power source and ground potentials, respectively, so that the game apparatus determines that the peripheral device connected to the socket connector employs the three-wire handshake type communication mode; and
- means for supplying said apparatus with a three-wire handshake type data signal via said seventh, eighth, second and third pins in response to a second control signal including a peripheral device selection signal via said fourth pin.

11. A peripheral device for a game apparatus having an interface means for communicating with a peripheral device with any of communication modes of a clocked parallel type, a clocked serial type, a three-wire handshake type and a TH/TR selection type, said interface means having a socket connector with a set of nine (9) socket pins, said peripheral device comprising:
- a plug connector detachably connectable to the socket connector, said plug connector having a set of nine (9) plug pins disposed in a row from first to ninth plug pins in correspondence to said socket pins;
- means for receiving via the first and the ninth plug pins a power source potential, and ground potential, respectively;
- means for connecting the fifth plug pin with the sixth plug pin;
- means for supplying the game apparatus with a data signal including identification data representing a clocked parallel type communication mode in response to a first control signal including a first control data combination of "1" to the fourth plug pin and "1" to the fifth plug pin and a second control data combination of "0" to the fourth plug pin and "1" to the fifth plug pin supplied from the game apparatus, said identification data including a data combination of "0" to the seventh plug pin, "0" to the eighth plug pin, "1" to the second plug pin, and "1" to the third plug pin, wherein "1" and "0" correspond to the power source and ground potentials, respectively, so that the game apparatus determines that the peripheral device connected to the socket connector employs the clocked parallel type communication mode; and
- means for supplying said apparatus with a clocked parallel data signal via said seventh, eighth, second and third pins in response to a second control signal including a peripheral device selection signal via said fourth pin and a clock signal via said fifth pin.

12. A peripheral device for use with a data processing apparatus having an interface means for communicating with a peripheral device with any of communication modes of a clocked parallel type, a clocked serial type, a three-wire handshake type and a TH/TR selection type, said interface means including a socket connector with nine socket pins, comprising:
- a plug connector detachably connectable to said socket connector, said plug connector having nine plug pins disposed correspondingly to the socket pins, said plug pins including a pair of first pins for connecting to fixed potentials, four second pins for conducting data signals, a pair of third pins for receiving control signals and a fourth pin which is disposed adjacent to one of said pair of third pins;
- a cable including a plurality of wires connecting the plug pins of said plug connector with terminals on a printed circuit board of said peripheral device;
- means for short-circuiting said fourth pin with one of said pair of third pins adjacently disposed to said fourth pin;
- means for supplying a data signal including identification data representing a clocked parallel communication mode of said peripheral device on said second pins in response to a first control signal for requesting the identification data from said apparatus to said peripheral device via said pair of third pins; and
- means for supplying said apparatus with a parallel data signal including manipulation data via said four second pins in response to a second control signal supplied from said apparatus via said pair of third pins.

13. A peripheral device for use with a data processing apparatus having a socket connector with nine socket pins, comprising:
- a plug connector detachably connectable to said socket connector, said plug connector having nine plug pins disposed correspondingly to the socket pins, said plug pins including a pair of first pins for connecting to fixed potentials, four second pins for conducting data signals, a pair of third pins for receiving a control signal and a fourth pin which is disposed adjacent to one of said pair of third pins;
- a cable including a plurality of wires connecting the plug pins of said plug connector with terminals on a printed circuit board of said peripheral device;

short-circuiting means for short-circuiting said fourth pin with one of said pair of third pins within said plug connector; and means for providing data signals including identification data representing a clocked parallel communication mode of said peripheral device on said second pins in response to the control signal for collecting the identification data from said apparatus to said peripheral device via said third pins.

14. The peripheral device of claim 13, wherein the wires of said cable are fewer in number than said socket pins.

15. A peripheral device for use with a data processing apparatus having an interface means for communicating with a peripheral device with any of communication modes of a clocked parallel type, a clocked serial type, a three-wire handshake type and a TH/TR selection type, said interface means including a socket connector with nine socket pins, comprising:

a plug connector detachably connectable to said socket connector, said plug connector having nine plug pins disposed correspondingly to the socket pins, said plug pins including a pair of first pins for connecting to fixed potentials, a plurality of second pins for conducting data signals, and two third pins for conducting control signals;

a cable including a plurality of wires connecting the plug pins of said plug connector with terminals on a printed circuit board of said peripheral device;

means for short-circuiting remaining plug pins other than said first pins, one of said plurality of second pins and said two third pins to at least one of said first pins; and means for supplying a data signal including identification data representing a communication mode of said peripheral device on said plurality of second pins in response to a first control signal for requesting the identification data from said apparatus to said peripheral device via said third pins; and means for supplying said apparatus with a serial data signal including manipulation data via said one second pin not short-circuited by said short-circuiting means in response to a second control signal supplied via said pair of third pins from said apparatus.

16. A peripheral device for use with a data processing apparatus having a socket connector with nine socket pins, comprising:

a plug connector detachably connectable to said socket connector, said plug connector having nine plug pins disposed correspondingly to the socket pins, said plug pins including a pair of first pins for connecting to fixed potentials, a plurality of second pins for conducting data signals, and two third pins for conducting control signals;

a cable including a plurality of wires connecting the plug pins of said plug connector with terminals on a printed circuit board of said peripheral device;

short-circuiting means for short-circuiting remaining plug pins other than said first pins, one of said plurality of second pins and said two third pins to at least one of said first pins in said plug connector; and means for supplying a data signal including identification data representing a communication mode of said peripheral device on said plurality of second pins in response to a control signal for requesting identification data from said apparatus to said peripheral device via said third pins.

17. The peripheral device of claim 16, wherein the wires in said cable are fewer in number than said socket pins.

18. A game apparatus, comprising:

a data processing apparatus having an interface means for communicating with a peripheral device with any of communication modes of a clocked parallel type, a clocked serial type, a three-wire handshake type and a TH/TR selection type, said interface means having a peripheral port with a plurality of terminal pins disposed in a row, said plurality of terminal pins in said row including a pair of first pins, one of said first pins for conducting one of a power source and ground potential and the other of said first pins for conducting the other of the power source and the ground potential, a plurality of second pins for conducting data signals, a pair of third pins for conducting control signals, said data processing apparatus further having means of determining which one of the communication modes to use based on the data signals on said plurality of second pins, means for conducting a first control signal for requesting identification data via said pair of third pins and a second control signal including a signal for selecting a peripheral device via one of said pair of third pins, and means for communicating in the determined communication mode; and a peripheral device having a plug connector detachably connectable to said peripheral port, said plug connector having a plurality of plug pins identical in number and disposed in a row in correspondence to the terminal pins of said peripheral port, said peripheral device further having a cable including a plurality of wires connecting the plug pins of said plug connector with a printed circuit board of said peripheral device and means for supplying the data signals including identification data representing the communication mode of said peripheral device on said plurality of second pins in response to the first control signal supplied from said apparatus, and means for supplying said data processing apparatus with a data signal including manipulation data via at least one of said plurality of second pins in response to the second control signal supplied from said apparatus.

19. The apparatus of claim 18, wherein said peripheral port comprises four of said second pins, said second and third pins being disposed between said pair of first pins.

20. The apparatus of claim 19, wherein said plug connector comprises a pair of first pins, four of second pins and a pair of third pins, each being disposed correspondingly to a respective pin in said peripheral port.

21. The apparatus of claim 20, said second control signal further comprising a clock signal conducted via the other of said third pins, said plurality of terminal pins further comprising a fourth pin, and said peripheral device further comprising means for transmitting an acknowledgment signal to the data processing apparatus via said fourth pin in said peripheral port and means for transmitting the data signals via said four second pins.

22. The apparatus of claim 20, said second control signal further comprising a clock signal conducted via the other of said third pins, said plurality of terminal pins further comprising a fourth pin, said peripheral device further comprising means for short-circuiting said fourth pin with the other of said third pins, and means for conducting parallel data signals via said four second pins.

23. The game apparatus of claim 18, wherein said data processing apparatus includes means for having parallel access to the data rendered on the second, third, seventh and eighth pins of the peripheral port.

24. A game apparatus, comprising:

a data processing apparatus having a peripheral port with a plurality of terminal pins disposed in a row, said plurality of terminal pins in said row including a pair of first pins, one of said first pins for conducting one of a power source and ground potential and the other of said first pins for conducting the other of the power source and the ground potential, four second pins for conducting data signals, three third pins, said second and third pins being disposed between said pair of first pins, said data processing apparatus further having means for determining a communication mode based on the data signals on said four second pins, means for conducting a control signal for requesting identification data via at least one of said third pins, and means for communication in the determined communication mode; and a peripheral device having a plug connector detachably connectable to said peripheral port, said plug connector having a plurality of plug pins identical in number and disposed in a row in correspondence to the terminal pins of said peripheral port, said peripheral device further having a cable including a plurality of wires connecting the plug pins with a printed circuit board of said peripheral device and means for supplying data signals including identification data representing the communication mode of said peripheral device on said four second pins in response to the control signal supplied from said apparatus, said data processing apparatus further comprising means for transmitting a signal for selecting said peripheral device via one of said third pins in the peripheral port and a clock signal via another of said third pins, and said peripheral device further comprising means for transmitting serial data signals via one of the second pins to said apparatus and means for selectively short-circuiting a remaining one of the third pins and a remaining three of the second pins with said first pins.

25. A game apparatus, comprising: data processing apparatus having an interface means for communicating with a peripheral device with any of communication modes of a clocked parallel type, a clocked serial type, a three-wire handshake type and a TH/TR selection type, said interface means having a socket connector with a set of socket pins consisting of first to ninth pins disposed in a row, said first pin for connecting to one of a power source and ground potential, said ninth pin for connecting to the other of the power source and the ground potential, said second, third, seventh and eighth pins for conducting data signals, said fourth and fifth pins for conducting control signals, said data processing apparatus further comprising first means for supplying to said fourth pin an identification data requesting signal and a peripheral device selecting signal, second means for reading data signals on said second, third, seventh and eighth pins, third means for determining a communication mode based on the data signals read by said second means, fourth means for transmitting a clock signal to said fifth pin, and fifth means for communicating in the determined communication mode;

a peripheral device having a plug connector detachably connected to said socket connector, said plug connector having a set of plug pins consisting of first to ninth plug pins disposed in a row in correspondence to said first to ninth socket pins, said peripheral device further comprising a cable including a plurality of wires connecting ones of the plug pins with terminals on a printed circuit board of said peripheral device, sixth means for supplying data signals including identification data representing the communication mode of said peripheral device on said second, third, seventh and eighth plug pins in response to said identification data requesting signal supplied by said data processing apparatus for requesting identification data, and seventh means for supplying said data processing apparatus with a data signal including manipulation data via at least one of said second, third, seventh and eighth plug pins while receiving said peripheral device selecting signal.

26. The apparatus of claim 25, said peripheral device further comprising eighth means for transmitting an acknowledgment signal to said data processing apparatus via the sixth plug pin.

27. The apparatus of claim 25, said peripheral device further comprising eighth means for short-circuiting said sixth plug pin with said fifth plug pin, and wherein said seventh means is constructed to supply parallel data signals via said second, third, seventh and eighth plug pins.

28. A game apparatus, comprising:

data processing apparatus having a socket connector with a set of socket pins consisting of first to ninth pins disposed in a row said first pin for connecting to one of a power source and ground potential, said ninth pin for connecting to the other of the power source and the ground potential, said second, third, seventh and eighth pins for conducting data signals, said fourth and fifth pins for conducting control signals, said data processing apparatus further comprising first means for supplying to said fourth pin an identification data requesting signal and a peripheral device selecting signal, second means for reading data signals on said second, third, seventh and eighth pins, third means for determining a communication mode based on the data signals read by said second: means, fourth means for transmitting a clock signal to said fifth pin, and fifth means for communicating in the determined communication mode;

a peripheral device having a plug connector detachably connected to said socket connector, said plug connector having a set of plug pins consisting of first to ninth plug pins disposed in a row in correspondence to said first to ninth socket pins, said peripheral device further comprising a cable including a plurality of wires connecting ones of the plug pins with terminals on a printed circuit board of said peripheral device, sixth means for supplying data signals including identification data representing the communication mode of said peripheral device on said second, third, seventh and eighth plug pins in response to said identification data requesting signal, seventh means for transmitting serial data signals via said third plug pin, eighth means for short-circuiting said second plug pin with said first plug pin, and ninth means for short-circuiting said sixth to eighth plug pins with said ninth plug pin.

29. A peripheral device for use with an information processing apparatus, said apparatus having an interface means for communicating with a peripheral device with any of communication modes of a clocked parallel type, a clocked serial type, a three-wire handshake type and a TH/TR selection type, said interface means having a peripheral port with a set of terminal pins consisting of first to ninth terminal pins disposed in a row in the order of the first to the ninth terminal pins, said apparatus having means for conducting one of a power source and a ground potential via said first terminal pin, means for conducting the other of the power source and the ground potential to said ninth terminal pin, means for determining which one of the communication modes to use for communicating with the peripheral device connected to the peripheral port based on data signals on said second, third, seventh and eighth terminal pins, said peripheral device comprising:

a plug connector detachably connectable to said peripheral port, said plug connector having a set of plug pins consisting of first to ninth plug pins disposed in a row in correspondence to said first to ninth terminal pins of the peripheral port;

means for supplying a data signal including identification data representing the communication mode of said peripheral device on said second, third, seventh and eighth plug pins in response to a first control signal supplied from said apparatus via the fourth and fifth pins for requesting the identification data; and means for supplying said apparatus with a data signal including manipulation data via at least one of said second, third, seventh and eighth pins in response to a second control signal supplied from said apparatus via at least one of said fourth and fifth pins.

30. A peripheral device for use an information processing apparatus having a socket connector with a set of socket pins, said peripheral device comprising:

means for supplying said apparatus with a data signal including manipulation data in a communication mode selected from communication modes of a clocked parallel type, clocked serial type, a three-wire handshake type and TH/TR selection type;

a plug connector detachably connectable to the socket connector, said plug connector having a set of plug pins disposed in a row in correspondence to the set of socket pins, said plug pins including a pair of first pins, a plurality of second pins, and a plurality of third pins;

means for receiving fixed potentials via said pair of first pins from the apparatus;

means for configuring said set of plug pins to represent the communication mode of the peripheral device; said configuration means comprising means for supplying data signals including identification data representing the communication mode of said peripheral device on said plurality of second pins in response to a first control signal for requesting the identification data supplied via two of said third pins from said apparatus; and means for supplying said apparatus with a data signal including the manipulation data via at least one of said second pins in response to a second control signal supplied from said apparatus via at least one of said third pins.

31. A peripheral device for use with a game apparatus having a peripheral port with a socket connector which comprises first to ninth terminal contacts disposed in a single row, means for supplying the power source potential and the ground potential to a peripheral device via the first and ninth contacts, respectively, the peripheral device comprising:

a plug connector detachably connectable to said peripheral port, said plug connector having a set of terminal contacts disposed in a single row correspondingly to said first to ninth terminal contacts of the socket connector;

a plurality of wires connecting ones of the terminal contacts of said plug connector with a printed circuit board of said peripheral device; and data supplying means for supplying data signals of a data combination to the game apparatus via said second, third, seventh and eighth contacts in response to receipt from said game apparatus of the control signal of a first signal combination in which the fourth contact conducts "1" and the fifth contact conducts "1", and of a second signal combination in which the fourth contact conducts "0" and the fifth contact conducts "1", wherein "1" and "0" correspond to the power source and ground potentials, respectively, said data signals of the data combination being selected so as to comply with the following formulas:

(data R in TH="1") or (data L in TH="1")="1", (data D in TH="1") or (data U in TH="1")="0", (data R in TH="0") or (data L in TH="0")="1" and (data D in TH="0") or (data U in TH="0")="1", wherein the data R is a data supplied on the seventh contact, the data L on the eighth contact, the data D on the second contact and the data U on the third contact, and TH is the control signal of said first or second signal combination supplied on the fourth contact;

thereby enabling the game apparatus to determine a communication mode of the peripheral device based upon the data from the seventh, the eighth, the second and the third contacts.

32. A peripheral device according to claim 31, further comprising a plurality of key switches which are manually manipulated by a player, wherein the data signals supplied from said data supplying means in response to the control signal of said first and second data combinations include signals indicative of some of said key switches, and wherein said data supplying means further comprises means for supplying data signals indicative of the key switches other than said some of the key switches via said seventh, eighth, second and third contacts to the game apparatus in response to receipt from said game apparatus of the control signal of a third signal combination in which the fourth contact conducts "1" and the fifth contact conducts "0", and of a fourth signal combination in which the fourth contact conducts "0" and the fifth contact conducts "0."

33. A peripheral device according to claim 32, wherein said data supplying means is constructed so as to supply data signals indicative of the key switches of "RIGHT", "LEFT", "DOWN" and "UP" via said seventh, eighth, second and third contacts in response to the control signal of said second signal combination.

34. A peripheral device according to claim 32, further comprising means for maintaining the sixth contact to the potential of "1" while said peripheral device receives the control signals of the first to fourth signal combinations.

35. A peripheral device for a game apparatus having an interface means for communicating with a peripheral device with any of communication modes of a clocked parallel type, a clocked serial type, a three-wire handshake type and a TH/TR selection type, said interface means having a connector port and means for supplying a power source potential, a ground potential, and control signals through said connector port, comprising:

a plug connector detachably connectable to the connector port, said plug connector having a set of nine (9) plug pins disposed in a row from first to ninth plug pins;

means for receiving via the first and the ninth plug pins the power source potential and the ground potential, respectively means for connecting the fifth plug pin with the sixth plug pin; and means, activated after the receipt of the power source potential and the ground potential, for supplying the game apparatus with a data signal including identification data indicative of the clocked parallel type communication mode in response to a first control signal from the game apparatus for requesting identification data, said identification data including a data combination of "0" to the seventh plug pin, "0" to the eighth plug pin, "1" to the second plug pin and "1" to the third plug pin, wherein "1" and "0" correspond to the power source and ground potentials, respectively, so that the game apparatus determines that the peripheral device connected to the connector port employs the clocked parallel type communication mode; and means for supplying said apparatus with the clocked parallel signal via said seventh, eighth, second and third pins in response to a second control signal including a peripheral device selection signal via said fourth pin and a clock signal via said fifth pin.

36. A peripheral device for a game apparatus having an interface means for communicating with a peripheral device with any of communication modes of a clocked parallel type, a clocked serial type, a three-wire handshake type and a TH/TR selection type, said interface means having a connector port and means for supplying a power source potential, a ground potential, and control signals through said connector port, comprising:

a plug connector detachably connectable to the connector port, said plug connector having a set of (9) plug pins disposed in a row from first to ninth plug pins;

means for receiving via the first and the ninth plug pins the power source potential and the ground potential, respectively means, activated after the receipt of the power source potential and the ground potential, for supplying the game apparatus with a data signal including identification data indicative of a clocked serial type communication mode in response to a first control signal from the game apparatus for requesting identification data, said identification data including a data combination of "0" to the seventh plug pin, "0" to the eighth plug pin, "1" to the second plug pin and "0" to the third plug pin, wherein "1" and "0" correspond to the power source and ground potentials, respectively, means for connecting the second plug pin with the first plug pin so as to provide the data signal of "1" to the second plug pin; and means for connecting the sixth, the seventh and the eighth plug pins with the ninth plug pin so as to provide the data signal of "0" to the seventh and the eighth plug pins, respectively;

whereby the game apparatus determines that the peripheral device connected to the connector port employs the clocked serial type communication mode; and means for supplying said apparatus with a clocked serial data signal via said third pin in response to a second control signal including a peripheral device selection signal via said fourth pin and a clock signal via said fifth pin.

37. A peripheral device for use with a game apparatus having a socket connector and means for supplying a power source potential, a ground potential, and a control signal through said socket connector, said peripheral device comprising:

a plug connector detachably connectable to the socket connector, said plug connector having nine (9) connector pins disposed in a row corresponding to socket pins of the socket connector, said connector pins including a first pin, a second pin, a third pin, a fourth pin, a fifth pin, a sixth pin, a seventh pin, an eighth pin, and a ninth pin;

means for receiving the power source potential and the ground potential from said game apparatus via said first and ninth pins, respectively;

a plurality of key switches formed on the peripheral device to be manually operated by a player; and data supplying means, when said peripheral device is activated after receipt of the power source potential and the ground potential, for supplying said game apparatus with data signals via the seventh pin, the eighth pin, the second pin and the third pin in response to the control signal from said game apparatus so that said data signals comprises a first data combination of "1", "0" and "0" respectively supplied to the eighth, second and third pins in response to the control signal of a first control signal combination in which the fourth pin becomes "1" and the fifth pin becomes "1" and a second data combination indicative of a selected four of said key switches in response to the control signal of a second control signal combination in which the fourth pin becomes "0" and the fifth pin becomes "1", wherein "1" and "0" correspond to the power source and ground potentials, respectively, said second data combination, together with said first data combination, being selected so as to represent a peripheral ID as well as a TH/TR communication mode of said peripheral device.

38. A peripheral device for a game apparatus according to claim 37, wherein said peripheral device is constructed such that, in response to the control signal of a third and a fourth control signal combination supplied via said fourth and fifth pins from said game apparatus, the peripheral device transmits signals indicative of ones of said key switches other than said selected four of the key switches to said game apparatus via said seventh pin, eighth pin, second pin and third pin.

39. A peripheral device for a game apparatus according to claim 37, wherein said second data combination comprises data indicative of the key switches of "RIGHT", "LEFT", "DOWN" and "UP" in a data combination complying with the formulas of {(data R in TH="0") or (data L in TH="0")}="1" and {(data D in TH="0") or (data U in TH="0")}="1" wherein the data R is a data supplied on the seventh pin, the data L on the eighth pin, the data D on the second pin and the data U on the third pin and TH is a data supplied on the fourth pin.

40. A peripheral device for a game apparatus according to claim 39, wherein said data supplying means supplies the seventh pin with a data of "RIGHT", the eighth pin with a data of "LEFT", the second pin with a data of "DOWN" and the third pin with a data of "UP".

41. A peripheral device for a game apparatus according to claim 37, wherein said data combination further includes a datum indicative of one of said key switches other than said selected four of the key switches supplied via the seventh pin, wherein said data signals further include a third and a fourth data combination associated with remaining ones of the key switches supplied in response to the control signal of a third control signal combination in which the fourth pin becomes "1" and the fifth pin becomes "0" and of a fourth control signal combination in which the fourth pin becomes "0" and the fifth pin becomes "0", respectively.

42. A peripheral device for use with a data processing apparatus having a peripheral port, means for supplying a power source potential, a ground potential, and a control signal through said peripheral port, and an interface means for communicating with a peripheral device with a communication mode of any a clocked parallel type, a clocked serial type, a three-wire handshake type or a TH/TR selection type and for determining which one of the communication modes to use for communicating with a peripheral device connected to the peripheral port based on data signals supplied from the peripheral device, the peripheral device comprising:

a connector detachably connectable to said peripheral port, said connector having a set of terminal contacts including first to ninth contacts disposed in a row, said first contact for connecting to one of the power source potential and the ground potential, said ninth contact for connecting to the other of the power source potential and the ground potential, said second, third, seventh and eighth contacts for transmitting data signals, and said fourth and fifth contacts for receiving the control signal;

a cable including a plurality of wires connecting ones of the terminal contacts of said connector with a printed circuit board of said peripheral device;

means, when said peripheral device is activated by the power source potential and the ground potential supplied through the peripheral port, for supplying a data signal including identification data representing a communication mode of said peripheral device on said second, third, seventh and eighth contacts in response to a first control signal supplied from said apparatus for requesting the identification data; and means for supplying said apparatus with a data signal including manipulation data via at least one of said second, third, seventh and eighth contacts in response to a second control signal supplied from said apparatus via at least one of said fourth and fifth contacts.

43. The peripheral device of claim 42, further comprising means for transmitting an acknowledgment signal to the data processing apparatus via the sixth contact.

44. The peripheral device of claim 42, wherein said second control signal includes a signal for selecting the peripheral device supplied via said fourth contact, wherein said peripheral device further comprises means for transmitting an acknowledgment signal via the sixth contact, and means for supplying the data signal including manipulating data via said second, third, seventh and eighth contacts.

45. A peripheral device for use with a data processing apparatus having a peripheral port and means for supplying a power source potential, a ground potential, and a control signal through said peripheral port, comprising:

a connector detachably connectable to said peripheral port, said connector having a set of terminal contacts including first to ninth contacts disposed in a row, said first contact for connecting to one of the power source potential and the ground potential, said ninth contact for connecting to the other of the power source potential and the ground potential, said second, third, seventh and eighth contacts for conducting data signals, and said fourth and fifth contacts for receiving the control signal;

a cable including a plurality of wires connecting ones of the terminal contacts of said connector with a printed circuit board of said peripheral device;

means for supplying data signals including identification data representing a communication mode of said peripheral device on said second, third, seventh and eighth contacts in response to a control signal supplied from said apparatus for requesting the identification data; and means for short-circuiting selected ones of said contacts.

46. The peripheral device of claim 45, wherein said fourth and fifth contacts are for receiving a signal for enabling the peripheral device and for receiving a clock signal, respectively, and said short-circuiting means comprises means for short-circuiting said sixth contact with said fifth contact of said connector, and wherein said peripheral device further comprises means for transmitting parallel data signals to the apparatus via said second, third, seventh and eighth contacts of said connector in synchronism with the clock signal.

47. The peripheral device of claim 45, wherein said fourth and fifth contacts are for transmitting a signal for enabling the peripheral device and for transmitting a clock signal, respectively, and said short-circuiting means comprises means for short-circuiting said second contact with said first contact of said connector, and means for short-circuiting said eighth contact with said ninth contact of said connector, and wherein said peripheral device further comprises means for transmitting serial data signals to the apparatus via said third contact of said connector in synchronism with the clock signal.

48. The peripheral device of claim 45, wherein said short-circuiting means is within said connector.

49. A peripheral device for use with a data processing apparatus having a peripheral port and means for supplying a power source potential, a ground potential, and a control signal through said peripheral port, comprising:

a connector detachably connectable to said peripheral port, said connector having a set of terminal contacts including first to ninth contacts disposed in a row, said first contact for connecting to one of the power source potential and the ground potential, said ninth contact for connecting to the other of the power source potential and the ground potential, said second, third, seventh and eighth contacts for conducting data signals, and said fourth and fifth contacts for receiving the control signal;

a cable including a plurality of wires connecting ones of the terminal contacts of said connector with a printed circuit board of said peripheral device, the wires of said cable being fewer in number than said terminal contacts; and means for supplying the data signals including identification data representing a communication mode of said peripheral device to the apparatus via said second, third, seventh and eighth contacts in response to a control signal supplied from said apparatus for requesting the identification data.

50. A peripheral device for use with a data processing apparatus having a peripheral port and means for supplying a power source potential, a ground potential, and a control signal through said peripheral port, comprising:

a connector detachably connectable to said peripheral port, said connector having a set of terminal contacts including first to ninth contacts disposed in a row, said first contact for connecting to one of the power source potential and the ground potential, said ninth contact for connecting to the other of the power source potential and the ground potential, said second, third, seventh, and eighth contacts for conducting data signals, and said fourth and fifth contacts for receiving the control signal;

a cable including a plurality of wires connecting ones of the terminal contacts of said connector with a printed circuit board of said peripheral device; and means for supplying the data processing apparatus with data signals including identification data representing a three-wire handshake type communication mode, including means, in response to a control signal of "1" to the fourth contact and "1" to the fifth contact and a control signal of "0" to the fourth contact and "1" to the fifth contact supplied from the data processing apparatus, for supplying a data signal of "0" to the seventh contact, "0" to the eighth contact, "0" to the second contact and "1" to the third contact, respectively, wherein "1" and "0" correspond to the power source and ground potentials, respectively, so that the data processing apparatus determines that the peripheral device employs the three-wire handshake type communication mode.

51. A peripheral device for use with a data processing apparatus having a peripheral port, and means for supplying a power source potential, a ground potential, and a control signal through said peripheral port, comprising:

a connector detachably connectable to said peripheral port, said connector having a set of terminal contacts including first to ninth contacts disposed in a row, said first contact for connecting to one of the power source potential and the ground potential, said ninth contact for connecting to the other of the power source potential and the ground potential, said second, third, seventh and eighth contacts for conducting data signals, and said fourth and fifth contacts for receiving the control signal;

a cable including a plurality of wires connecting ones of the terminal contacts of said connector with a printed circuit board of said peripheral device; and means for supplying the data processing apparatus with the data signals indicative of a three-wire handshake type communication mode, including means for supplying a data signal of "0" to the seventh, the eighth and the second contacts, respectively, and "1" to the third contact in response to the control signal from the data processing apparatus, wherein "1" and "0" correspond to the power source and ground potentials, respectively, so that the data processing apparatus determines that the peripheral device employs the three-wire handshake type communication mode.

52. A peripheral device for use with a data processing apparatus having a peripheral port, and means for supplying a power source potential, a ground potential, and a control signal through said peripheral port, comprising:

a connector detachably connectable to said peripheral port, said connector having a set of terminal contacts including first to ninth contacts disposed in a row, said first contact for connecting to one of the power source potential and the ground potential, said ninth contact for connecting to the other of the power source potential and the ground potential, said second, third, seventh and eighth contacts for conducting data signals, and said fourth and fifth contacts for receiving the control signal;

a cable including a plurality of wires connecting ones of the terminal contacts of said connector with a printed circuit board of said peripheral device;

means for supplying the fifth contact and the sixth contact with the same potential; and means for supplying the data processing apparatus with the data signals indicative of a clocked parallel type communication mode, including means for supplying a data signal of "0" to the seventh contact, a data signal of "0" to the eighth contact, a data signal of "1" to the second contact and "1" to the third contact in response to the control signal from the data processing apparatus, wherein "1" and "0" correspond to the power source and ground potentials, respectively, so that the data processing apparatus determines that the peripheral device employs the clocked parallel type communication mode.

53. The peripheral device of claim 52, wherein said means for supplying data signals indicative of the clocked parallel type communication mode further comprises means, in response to a control signal of "1" to the fourth contact and "1" to the fifth contact and a control signal of "0" to the fourth contact and "1" to the fifth contact supplied from the data processing apparatus, for supplying a data signal of "0" to the seventh contact, "0" to the eighth contact, "1" to the second contact, and "1" to the third contact, respectively, so that the data processing apparatus determines that the peripheral device employs the clocked parallel type communication mode.

54. A peripheral device for use with a data processing apparatus having a peripheral port, and means for supplying a power source potential, a ground potential, and control signals through said peripheral port, comprising:

a connector detachably connectable to said peripheral port, said connector having a set of terminal contacts including first to ninth contacts disposed in a row, said first contact for connecting to one of the power source potential and the ground potential, said ninth contact for connecting to the other of the power source potential and the ground potential, said third contact for transmitting data signals and said fourth and fifth contacts for receiving the control signal;

a cable including a plurality of wires connecting ones of the terminal contacts of said connector with a printed circuit board of said peripheral device;

a plurality of key switches disposed on the peripheral device;

means for supplying the data processing apparatus with data signals indicative of a clocked serial type communication mode, including means for supplying the second contact with the same signal potential as that of the first contact so as to supply a data signal of "1" to the second contact, means for supplying the sixth, the seventh and eighth contacts with the same signal potential as that of the ninth contact so as to supply a data signal of "0" to the sixth, seventh and eighth contacts, respectively, and means for supplying a data signal of "0" to the third contact in response to a control signal from the data processing apparatus, wherein "1" and "0" correspond to the power source and ground potentials, respectively, so that the data processing apparatus determines that the peripheral device employs the clocked serial type communication mode; and means for supplying the apparatus with clocked serial data including data indicative of the key switches in response to a peripheral device selection signal supplied via said fourth contact and the clock signal supplied via said fifth contact.

55. The peripheral device of claim 54, wherein said means for supplying the data signals indicative of the clocked serial type communication mode further comprises means, in response to a control signal of "1" to the fourth contact and "1" to the fifth contact and a control signal of "0" to the fourth contact and "1" to the fifth contact supplied from the data processing apparatus, for supplying a data signal of "0" to the seventh contact, "0" to the eighth contact, "1" to the second contact, and "0" to the third contact, respectively, so that the data processing apparatus determines that the peripheral device employs the clocked serial type communication mode.

56. A peripheral device for use with a data processing apparatus having a peripheral port, means for supplying a power source potential, a ground potential, and a control signal through said peripheral port, the peripheral device comprising:

a connector detachably connectable to said peripheral port, said connector having a set of terminal contacts including first to ninth contacts disposed in a row, said first contact for connecting to one of the power source potential and the ground potential, said ninth contact for connecting to the other of the power source potential and the ground potential;

a cable including a plurality of wires connecting ones of the terminal contacts of said connector with a printed circuit board of said peripheral device; and means for supplying data signals of a predetermined data combination to the apparatus via said second, third, seventh and eighth contacts in response to receipt from said data processing apparatus of the control signal in a first signal combination in which the fourth contact conducts "1" and the fifth contact conducts "1", and in a second signal combination in which the fourth contact conducts "0" and the fifth contact conducts "1", wherein "1" and "0" correspond to the power source and ground potentials, respectively, said data signal of the predetermined data combination being selected so as to comply with the following formulas:

$$\{(\text{data } R \text{ in } TH\text{=}"1") \text{ or } (\text{data } L \text{ in } TH\text{=}"1")\} \times 8h + \{(\text{data } D \text{ in } TH\text{=}"1") \text{ or } (\text{data } U \text{ in } TH\text{=}"1")\} \times 4h + \{(\text{data } R \text{ in } TH\text{=}"0") \text{ or } (\text{data } L \text{ in } TH\text{=}"0")\} \times 2h + \{(\text{data } D \text{ in } TH\text{=}"0") \text{ or } (\text{data } U \text{ in } TH\text{=}"0")\} \times 1h = Bh$$

wherein the data R is a data supplied on the seventh pin, the data L on the eighth pin, data D on the second pin and the data U on the third pin, and TH is the control signal in said first or second signal combination supplied on the fourth pin, thereby enabling the data processing apparatus to determine a TH/TR communication mode based upon the data from the seventh contact, the eighth contact, the second contact, and the third contact.

57. A peripheral device for a data processing apparatus according to claim 56, said peripheral device comprising a control pad with a plurality of keys disposed thereon to be manually operated by an operator.

58. A peripheral device for a data processing apparatus according to claim 57, wherein, when said data processing apparatus supplies the control signal of said first control signal combination on the fourth and fifth contacts, the control pad transmits data back to said data processing apparatus assigning the seventh contact as a signal path to one of said plurality of keys, the eighth contact "1", the second contact "0", and the third contact "0", and when said data processing apparatus supplies the control signal of the second control signal combination, of a third control signal combination of "1" and "0", and of a fourth signal combination of "0" and "0" on the fourth and fifth contacts, respectively, the control pad transmits data back to said data processing apparatus such that signals on the seventh contact, eighth contact, the second contact, and the third contact are respectively associated with ones of said plurality of keys other than said one of the plurality of keys.

59. A peripheral device for a data processing apparatus according to claim 57, wherein said peripheral device is constructed such that, in response to the control signal of various signal combinations supplied to said control pad via said fourth and fifth contacts from said data processing apparatus, the control pad transmits signals representative of ones of said plurality of keys as 4-bit data groups, respectively, to said data processing apparatus via said seventh contact, eighth contact, second contact and third contact.

60. A peripheral device for a game apparatus having an interface means for communicating with a peripheral device with any of communication modes of a clocked parallel type, a clocked serial type, a three-wire handshake type and a TH/TR selection type, said interface means having a socket connector with a set of nine (9) socket pins, said peripheral device comprising:

a plug connector detachably connectable to the socket connector, said plug connector having a set of nine (9) plug pins disposed in a row from first to ninth plug pins corresponding to said socket pins;

means for receiving via the first and the ninth plug pins a power source potential and ground potential, respectively;

means for supplying the game apparatus with a data signal including identification data representing the clocked serial type communication mode in response to a first control signal including a first control data combination of "1" to the fourth plug pin and "1" to the fifth plug pin and a second control data combination of "0" to the fourth plug pin and "1" to the fifth plug pin supplied from the game apparatus, said identification data including a data combination of "0" to the seventh plug pin, "0" to the eighth plug pin, "1" to the second plug pin and "0" to the third plug pin, wherein "1" and "0" correspond to the power source and ground potentials, respectively;

means for connecting the second plug pin with the first pin so as to supply the data signal of "1" to the second plug pin; and means for connecting the sixth, the seventh and the eighth plug pins with the ninth plug pin so as to supply the data signal of "0" to the seventh and the eighth plug pins, respectively;

whereby the game apparatus determines that the peripheral device connected to the socket connector employs the clocked serial type communication mode; and means for supplying said apparatus with a clocked serial data signal via said third pin in response to a second control signal including a peripheral device selection signal via said fourth pin and a clock signal via said fifth pin.

61. A peripheral device for a game apparatus having an interface means for communicating with a peripheral device with any of communication modes of a clocked parallel type, a clocked serial type, a three-wire handshake type and a TH/TR selection type, said interface means having a connector port and means for supplying a power source potential, a ground potential, and control signals through said connector port, comprising:

a plug connector detachably connectable to the connector port, said plug connector having a set of nine (9) plug pins disposed in a row from first to ninth plug pins;

means for receiving via the first and the ninth plug pins the power source potential and the ground potential, respectively means, activated after the receipt of the power source potential and the ground potential, for supplying the game apparatus with a data signal including identification data indicative of a three-wire handshake type communication mode and including a data combination of "0" to the seventh, eighth and second plug pins, respectively, and "1" to the third plug pin in response to a first control signal from the game apparatus for requesting identification data, wherein "1" and "0" correspond to the power source and ground potentials, respectively, so that the game apparatus determines that the peripheral device connected to the connector port employs the three-wire handshake type communication mode; and means for supplying said apparatus with the three-wire handshake type data signal via said seventh, eighth, second and third pins in response to a second control signal including a peripheral device selection signal via said fourth pin.

* * * * *